(12) United States Patent
Satoh et al.

(10) Patent No.: US 9,170,339 B2
(45) Date of Patent: Oct. 27, 2015

(54) RADIATION MEASUREMENT APPARATUS

(71) Applicant: KABUSHIKI KAISHA TOSHIBA, Minato-Ku (JP)

(72) Inventors: Yoshinori Satoh, Yokohama (JP); Toru Onodera, Yokohama (JP); Naoto Kume, Yokohama (JP); Shunichiro Makino, Yokosuka (JP); Tetsuro Aikawa, Shinagawa-Ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/365,732

(22) PCT Filed: Dec. 13, 2012

(86) PCT No.: PCT/JP2012/082390
§ 371 (c)(1),
(2) Date: Jun. 16, 2014

(87) PCT Pub. No.: WO2013/089193
PCT Pub. Date: Jun. 20, 2013

(65) Prior Publication Data
US 2015/0117613 A1 Apr. 30, 2015

(30) Foreign Application Priority Data

Dec. 16, 2011 (JP) .................................. 2011-276363
Dec. 20, 2011 (JP) .................................. 2011-278374

(51) Int. Cl.
*G01T 1/17* (2006.01)
*G01T 1/29* (2006.01)
(Continued)

(52) U.S. Cl.
CPC ................. *G01T 1/2914* (2013.01); *G01T 1/16* (2013.01); *G01T 7/00* (2013.01); *G06T 11/60* (2013.01)

(58) Field of Classification Search
CPC ................................. G01T 1/17; G01T 1/2914
See application file for complete search history.

(56) References Cited

U.S. PATENT DOCUMENTS

2004/0001525 A1*  1/2004  Yano et al. .................... 374/121
2006/0208154 A1   9/2006  Hughes et al.
2011/0170778 A1*  7/2011  Le Goaller et al. ........... 382/180

FOREIGN PATENT DOCUMENTS

JP    63 151884    6/1988
JP    3 138592     6/1991
(Continued)

OTHER PUBLICATIONS

International Preliminary Report on patentability issued Jun. 17, 2014 in PCT/JP2012/082390 filed Dec. 13, 2012 (English translation only).

(Continued)

*Primary Examiner* — David Porta
*Assistant Examiner* — Hugh H Maupin
(74) *Attorney, Agent, or Firm* — Oblon, McClelland, Maier & Neustadt, L.L.P.

(57) ABSTRACT

A radiation measurement apparatus 10 includes a visible image acquisition unit 11 that takes a visible image, a radiation intensity acquisition unit 12 that measures intensity distribution of radiation incoming from a direction being substantially equal to an image picking up direction of the visible image acquisition unit, and an intensity display unit 15A that displays an image acquired by overlaying the intensity distribution of radiation, which is represented by using a plurality of colors being allocated to the intensity distribution of radiation on the visible image.

14 Claims, 15 Drawing Sheets

(51) Int. Cl.
*G01T 1/16* (2006.01)
*G01T 7/00* (2006.01)
*G06T 11/60* (2006.01)

(56) References Cited

FOREIGN PATENT DOCUMENTS

| JP | 6 109850 | 4/1994 |
| JP | 9-21704 | 1/1997 |
| JP | 9 101371 | 4/1997 |
| JP | 9-178566 | 7/1997 |
| JP | 11 231063 | 8/1999 |
| JP | 2001 311791 | 11/2001 |
| JP | 2004 37281 | 2/2004 |
| JP | 2005 510742 | 4/2005 |
| JP | 2006 208313 | 8/2006 |
| JP | 2007 17323 | 1/2007 |
| JP | 2008 188164 | 8/2008 |
| JP | 4371723 | 11/2009 |
| JP | 5057839 | 10/2012 |

OTHER PUBLICATIONS

Written Opinion issued Mar. 19, 2013 in PCT/JP2012/082390 filed Dec. 13, 2012 (English translation only).
International Search Report Issued Mar. 19, 2013 in PCT/JP12/082390 Filed Dec. 13, 2012.

\* cited by examiner

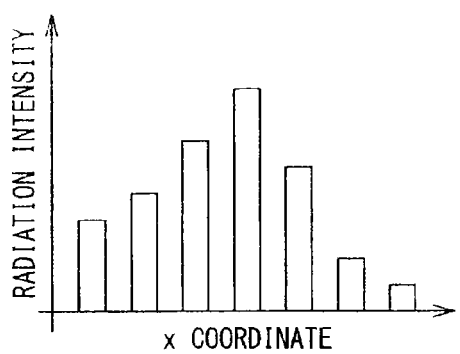 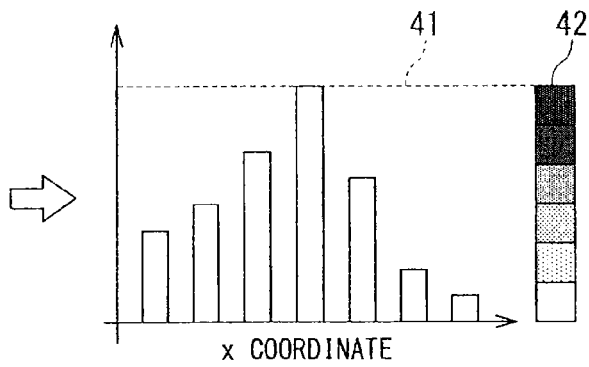
FIG. 6A         FIG. 6B
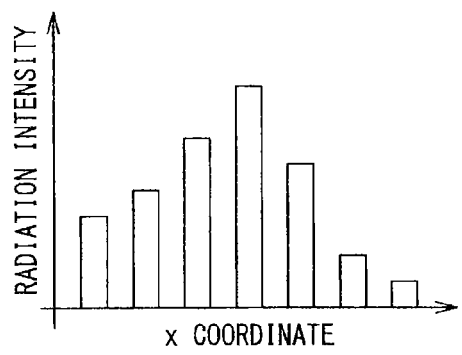 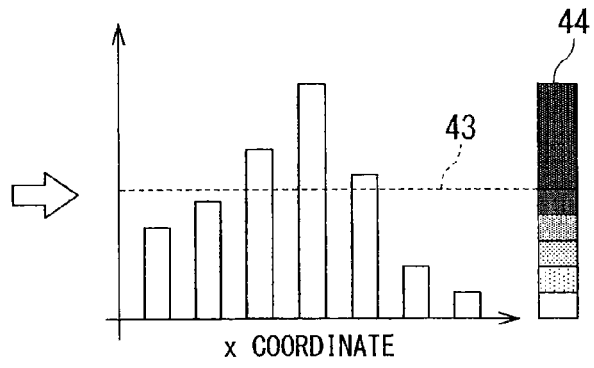
FIG. 7A         FIG. 7B
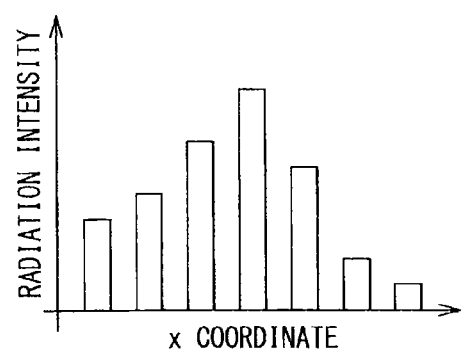 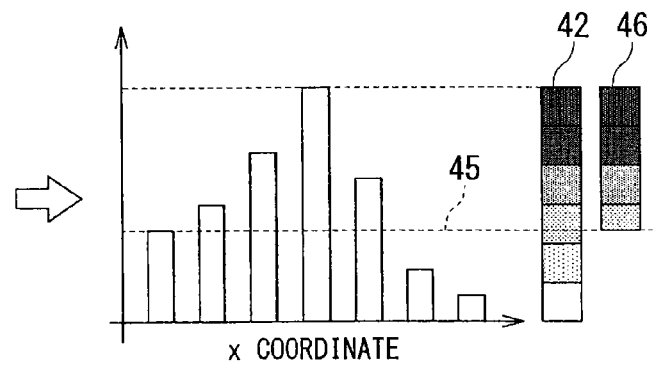
FIG. 8A         FIG. 8B

RADIATION MEASUREMENT APPARATUS

TECHNICAL FIELD

The present invention relates to a radiation measurement apparatus that measures an intensity distribution of radiation.

BACKGROUND ART

It is important for operators working in a nuclear electricity generation plant or citizens living in a neighborhood of the nuclear electricity generation plant to reduce radiation exposure. Further, in a case where user wants to determine a position of radiation source in some place such as operation site, it is required that a radiation measurement apparatus that has a high portability or enables user to take it anywhere. Conventionally, radiation measurement technology disclosed in patent document 1 has known as an example of radiation measurement technology.

The radiation measurement technology disclosed in patent document 1 includes a radiation detector that is arranged in two-dimensional arrangement such as a matrix or the like and a collimator that arranges in front of the radiation detector and limits incoming direction of radiation, and visualizes radiation intensity as two dimensional distribution.

PRIOR ART DOCUMENT

Patent Document

Patent Document 1: Publication of (Unexamined) Japanese Patent Application No. 2005-49136

DESCRIPTION OF INVENTION

Problems to be Solved by Invention

If conventional radiation measurement technology is used, radiation intensity distribution which has certain view angle with respect to facing direction of radiation measurement apparatus can be acquired at one time. Accordingly, conventional radiation measurement technology reduces workload in measurement operation.

However, in the site where many structures are provided to an apparatus, such as the nuclear power plant, when user merely observes two-dimensional (2D) radiation distribution, it is difficult for the user to determine and intuitively understand desired information such as members being radiation source and/or incoming direction of radiation.

Further, if user uses the radiation measurement apparatus at site where many structures are provided to an apparatus, such as the nuclear power plant, it is important that the radiation measurement apparatus has a high portability or enables user to easily take it anywhere as well as that the radiation measurement apparatus can measure radiation with better precision.

Here, there is an idea which improves space resolution of radiation intensity distribution as an example of idea further increasing measurement accuracy of radiation. If space resolution of radiation intensity distribution is improved, it is required to increase the arrangement number of radiation detectors.

However, if the arrangement number of radiation detectors is merely increased, housing size of the radiation measurement apparatus gets larger. If carries the radiation measurement apparatus and uses it while user moves, since portability of the radiation measurement apparatus should be considered, it is required that the housing size fits within required size. As described above, since relation between portability and space resolution is incompatible (trade-off), there is a problem in that it become difficult to acquire radiation intensity distribution which has high resolution if the housing size is limited.

The present invention has been made in consideration of the circumstances mentioned above, and an object thereof is to provide a radiation measurement apparatus that enables user to intuitively recognize a radiation measurement result. Further, the object of the present invention is to provide a radiation measurement apparatus that can improve resolution as well as portability.

Means for Solving Problem

In order to solve the problem in the conventional art mentioned above, the present invention provides a radiation measurement apparatus comprising: a visible image acquisition unit that picks up a visible image; a radiation intensity acquisition unit that measures intensity distribution of radiation incoming from a direction being substantially equal to an image picking up direction of the visible image acquisition unit; and an intensity display unit that displays an image acquired by overlaying the intensity distribution of radiation, which is represented by using a plurality of colors being allocated to the intensity distribution of radiation on the visible image.

Effect of Invention

According to the present invention, user can intuitively recognize a radiation measurement result. Further, the present invention can improve resolution as well as portability.

BRIEF DESCRIPTION OF DRAWINGS

FIG. 5 (which includes FIGS. 5A, 5B, and 5C) is an explanation diagram explaining contents of overlay processing in a first radiation measurement procedure performed by the radiation measurement apparatus according to first embodiment.

FIG. 6 (which includes FIGS. 6A and 6B) is an explanation diagram explaining allocation of colors with respect to radiation intensity distribution performed by a intensity display unit of the radiation measurement apparatus according to first embodiment. FIG. 6A is an explanation diagram illustrating a radiation intensity distribution in x axis direction, and FIG.

6B is an explanation diagram illustrating color allocation of the radiation intensity distribution, based on a maximum value of radiation intensity.

FIG. 7 (which includes FIGS. 7A and 7B) is an explanation diagram explaining allocation of colors with respect to radiation intensity distribution performed by a intensity display unit of the radiation measurement apparatus according to first embodiment. FIG. 7A is an explanation diagram illustrating a radiation intensity distribution in x axis direction, and FIG. 7B is an explanation diagram illustrating color allocation of the radiation intensity distribution, based on a user maximum value set by user.

FIG. 8 (which includes FIGS. 8A and 8B) is an explanation diagram explaining allocation of colors with respect to radiation intensity distribution performed by a intensity display unit of the radiation measurement apparatus according to first embodiment. FIG. 8A is an explanation diagram illustrating a radiation intensity distribution in x axis direction, and FIG. 8B is an explanation diagram illustrating color allocation of the radiation intensity distribution, based on an average value of radiation intensity.

Figure 9:
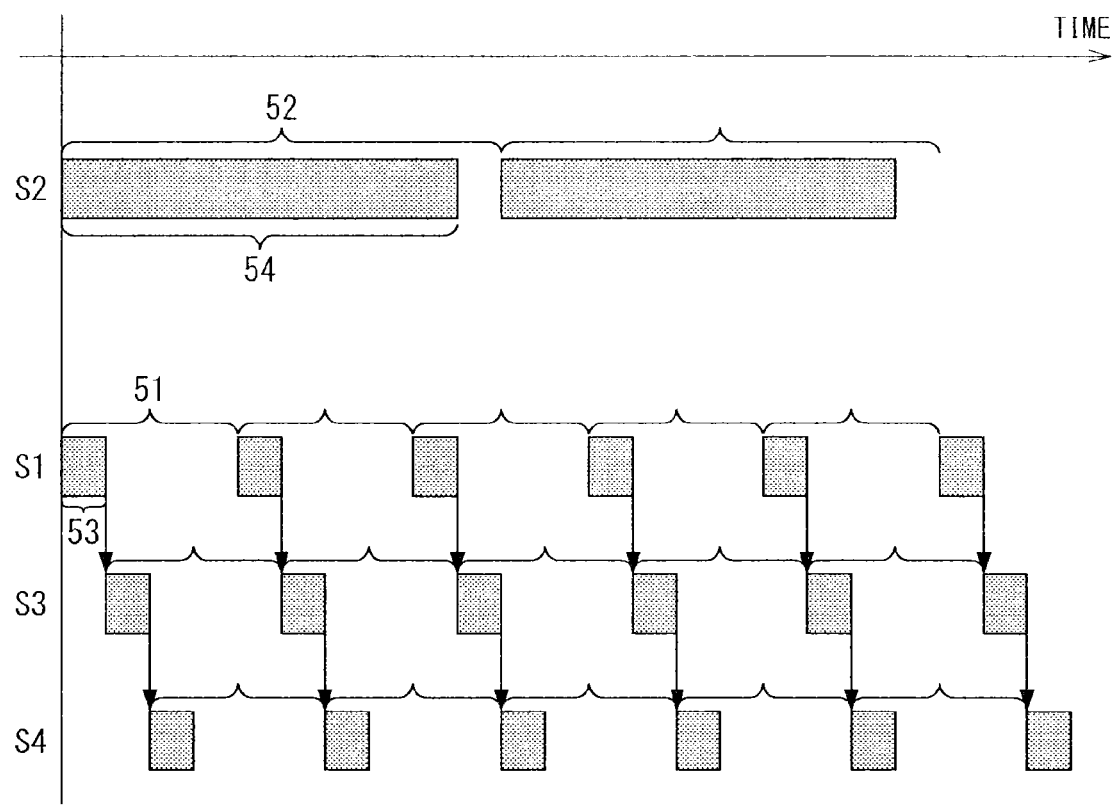

FIG. 9 is a timeline explaining a first timing example when processing steps (steps S1 to S4) of the first radiation measurement procedure performed by the radiation measurement apparatus according to first embodiment are performed.

Figure 10:
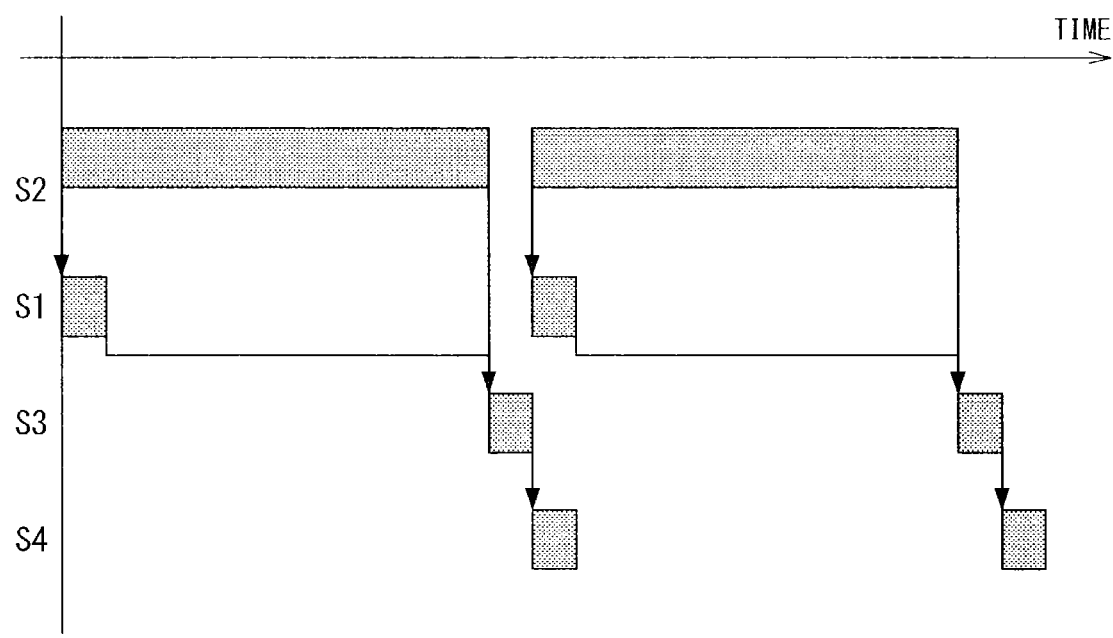

FIG. 10 is a timeline explaining a second timing example when processing steps (steps S1 to S4) of the first radiation measurement procedure performed by the radiation measurement apparatus according to first embodiment are performed.

Figure 11:
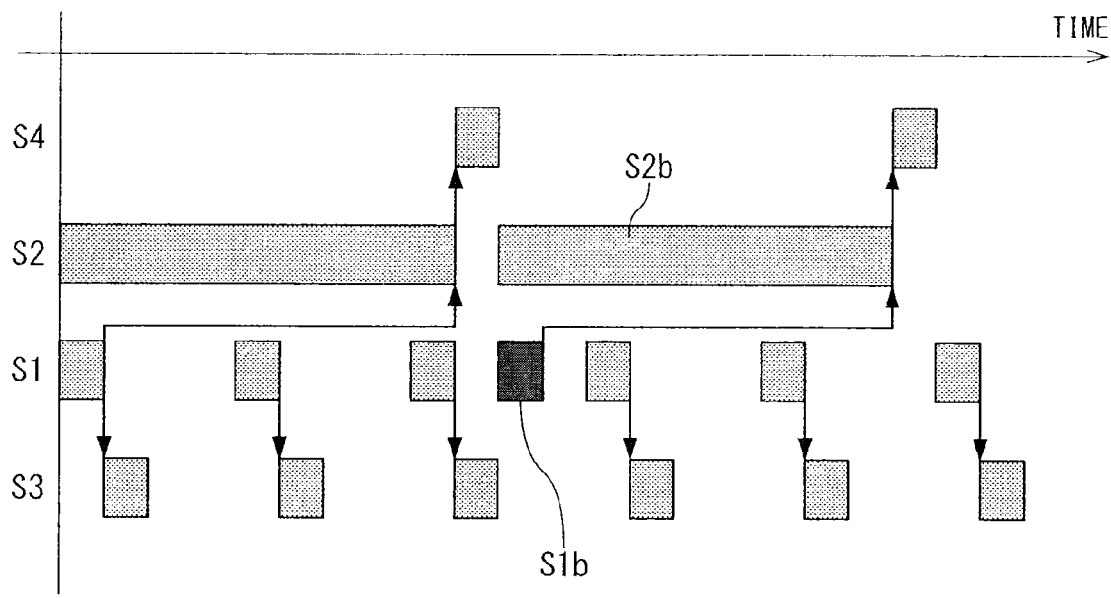

FIG. 11 is a timeline explaining a third timing example when processing steps (steps S1 to S4) of the first radiation measurement procedure performed by the radiation measurement apparatus according to first embodiment are performed.

Figure 12:
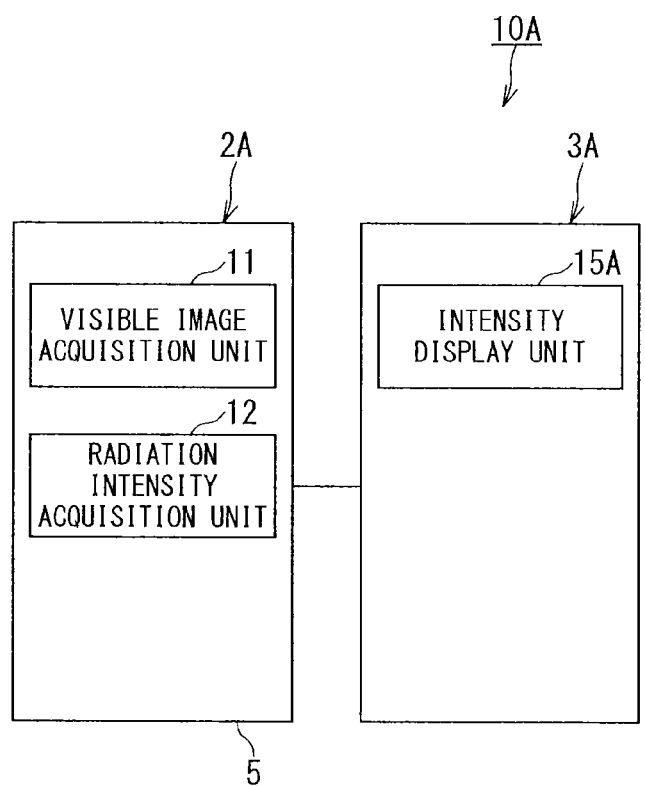

FIG. 12 is a configuration diagram of another example of the radiation measurement apparatus according to first embodiment.

Figure 13:
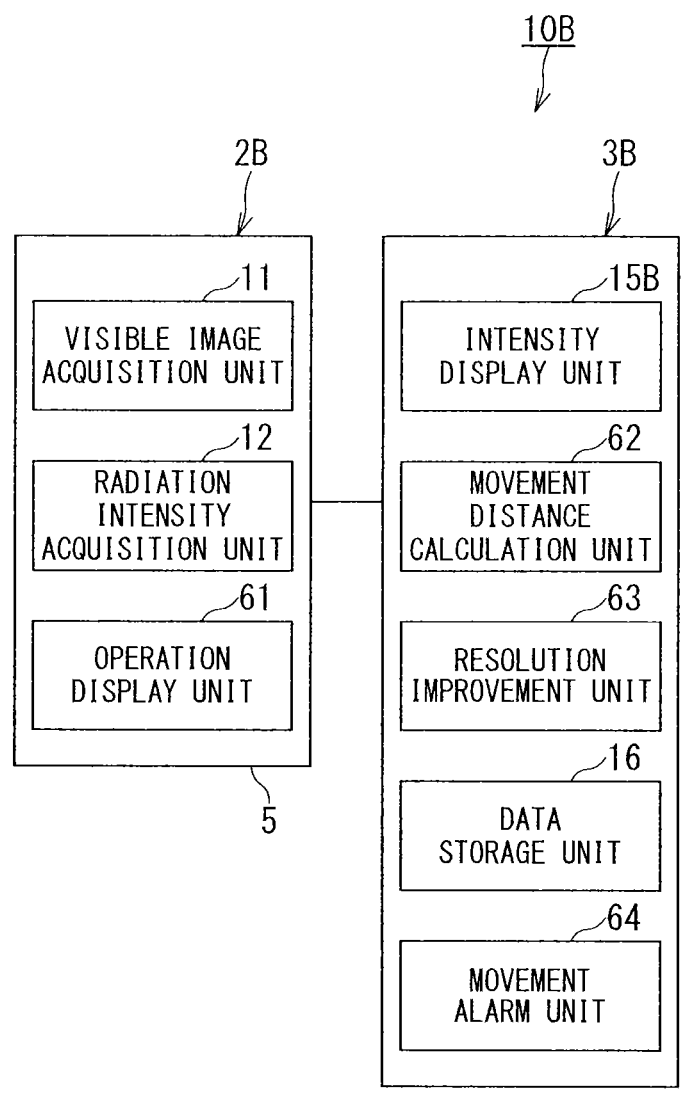

FIG. 13 is a configuration diagram of a radiation measurement apparatus according to second embodiment.

Figure 14:
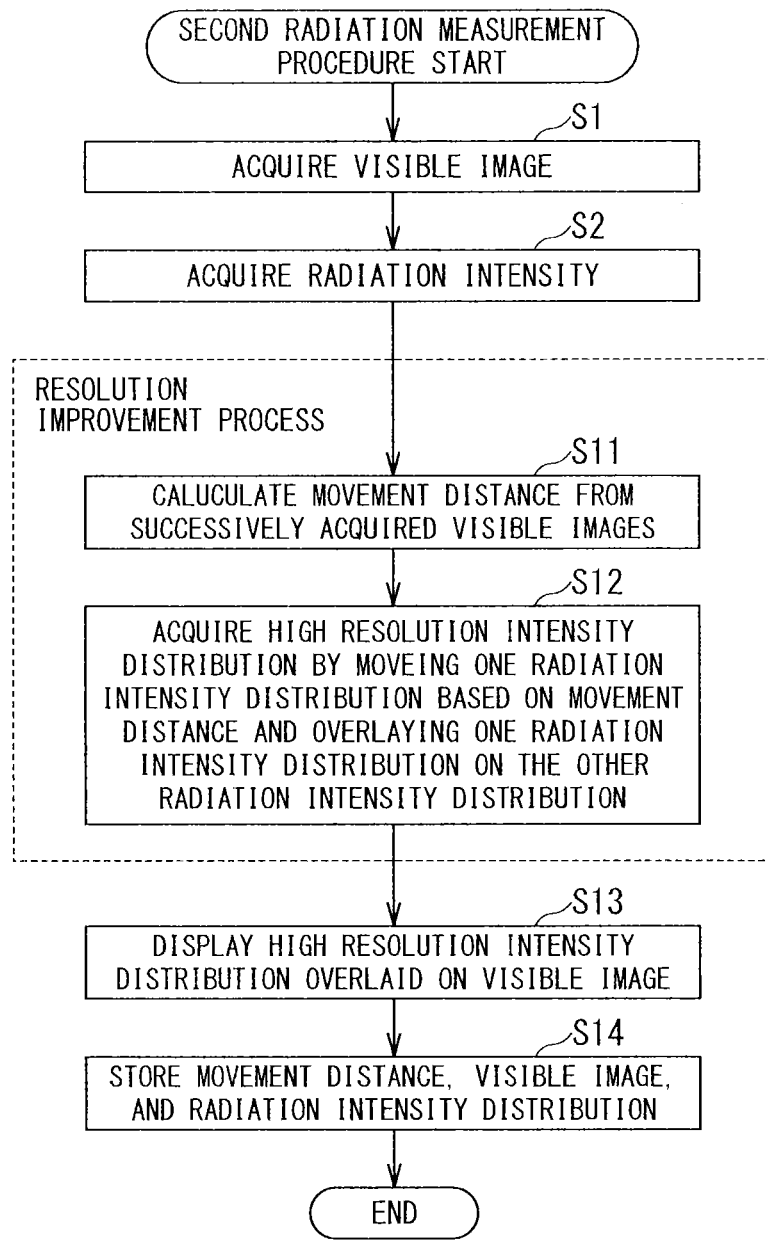

FIG. 14 is a flowchart explaining processing steps of a second radiation measurement procedure performed by the radiation measurement apparatus according to second embodiment.

Figure 15:
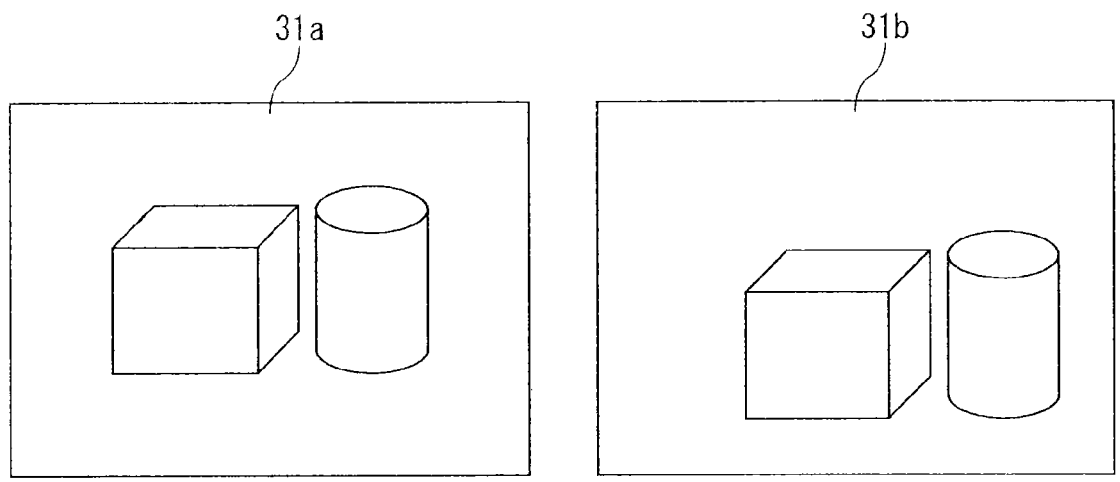

FIG. 15 is an explanation diagram of two visible images successively acquired in the radiation detector included in the radiation measurement apparatus according to second embodiment.

Figure 16:
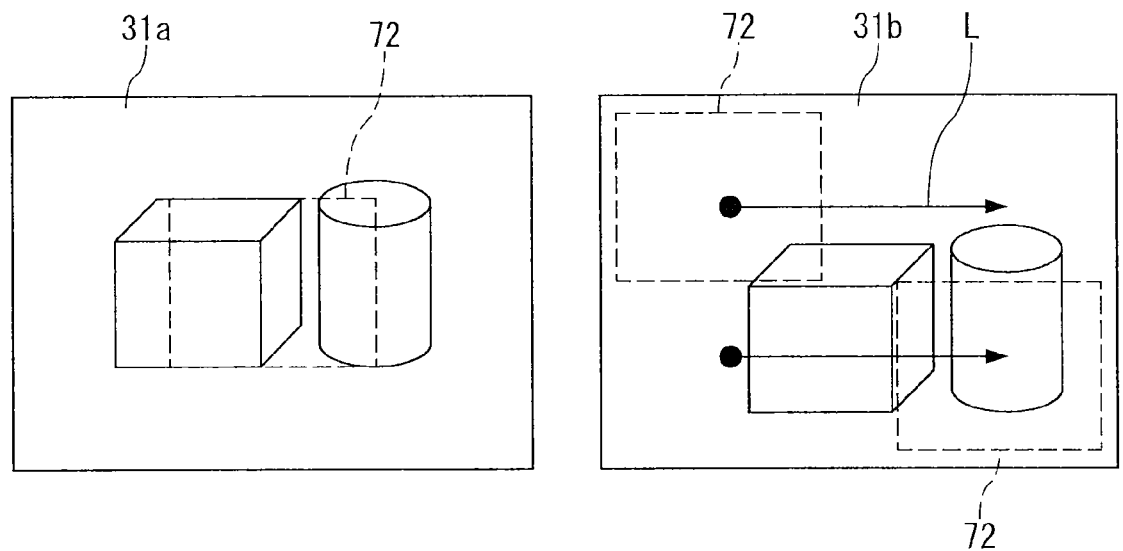

FIG. 16 is an explanation diagram explaining movement distance calculated from two visible images successively acquired in the radiation detector included in the radiation measurement apparatus according to second embodiment.

Figure 17:
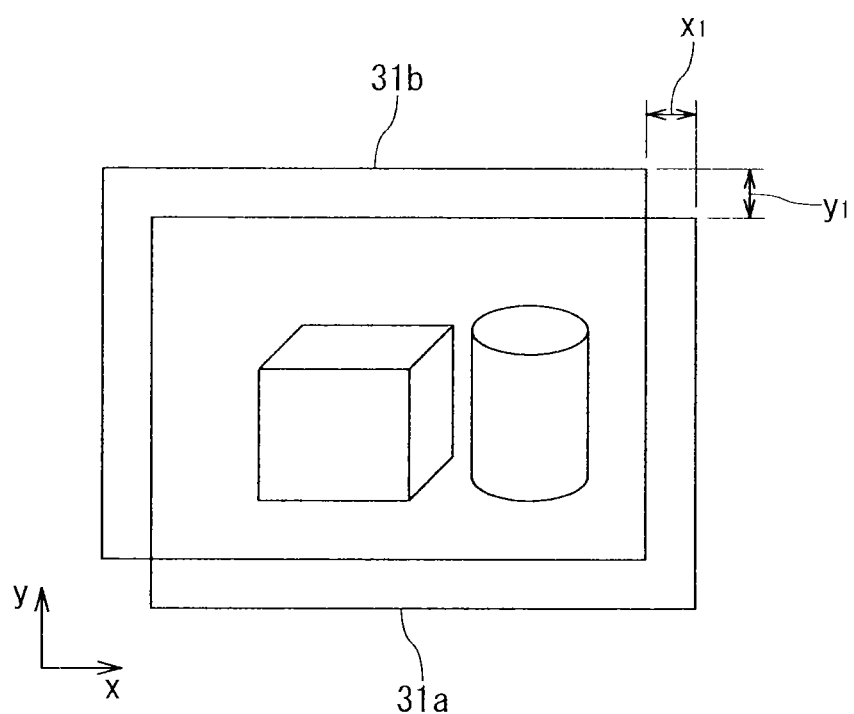

FIG. 17 is an explanation diagram explaining positional relation of two visible images when correlation value becomes maximum value in the radiation measurement apparatus according to second embodiment.

Figure 18A:
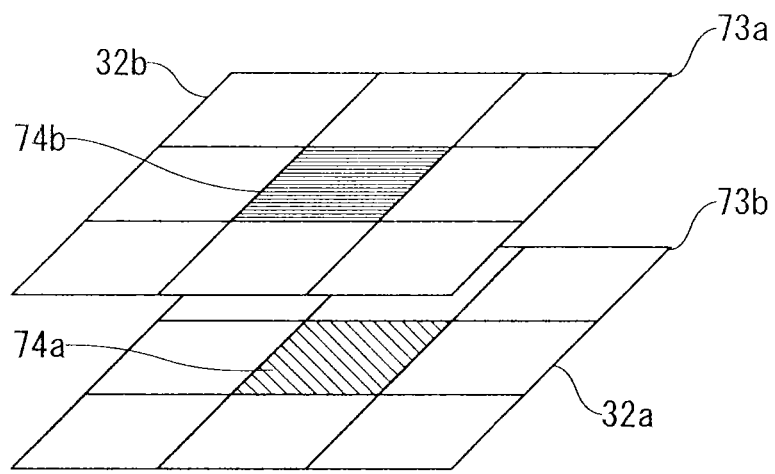
Figure 18B:
Figure 18B:
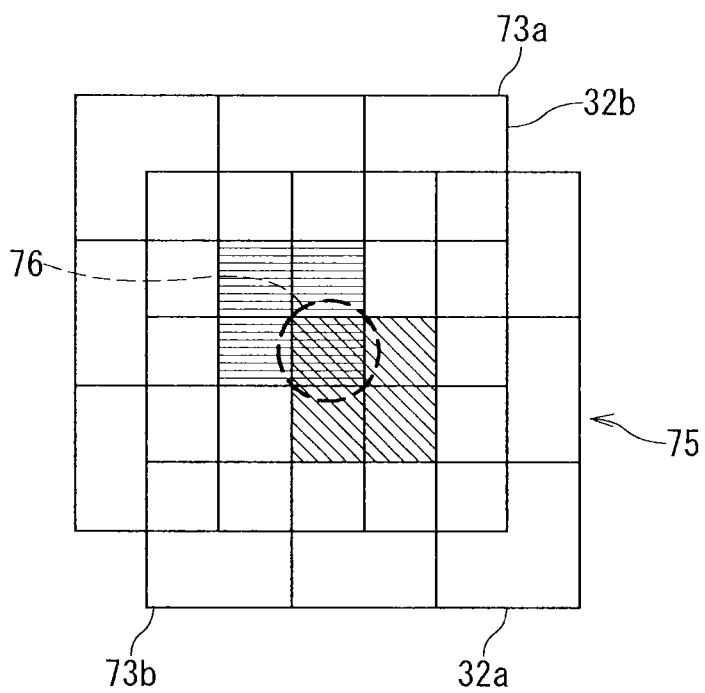

FIG. 18 (which includes FIGS. 18A and 18B) is an explanation diagram explaining a case where radiation intensity distribution (high resolution intensity distribution) having twice as high resolution as resolution of original radiation intensity distribution is created. FIG. 18A is an explanation diagram explaining a state before two radiation intensity distributions are overlapped. FIG. 18B is an explanation diagram explaining a state after two radiation intensity distributions are overlapped.

Figure 19:
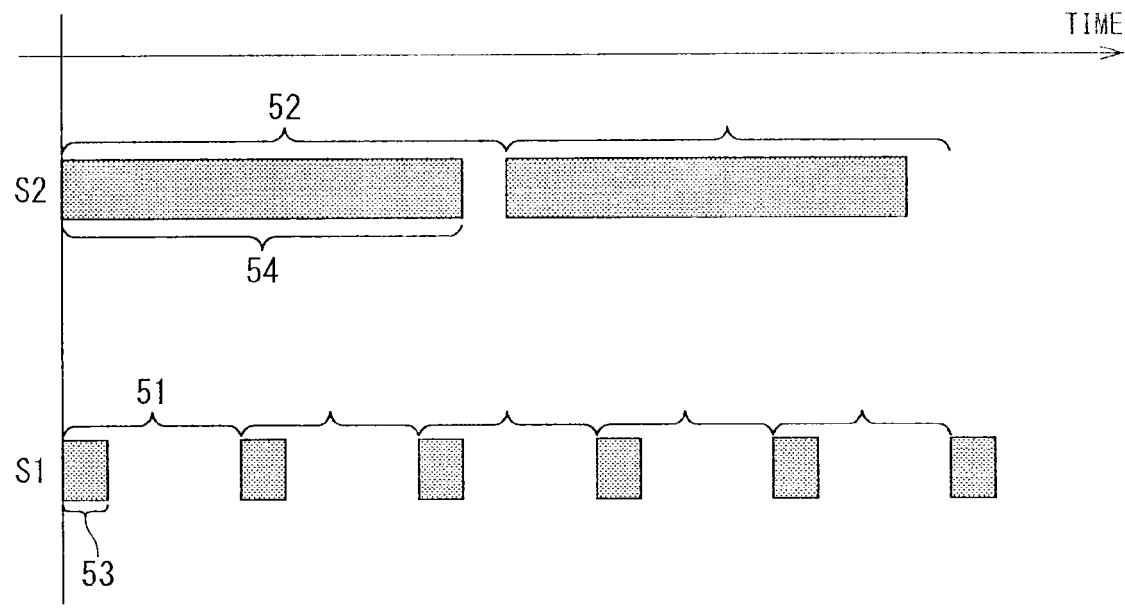

FIG. 19 is a timeline explaining a timing example when processing steps (steps S1 and S2) of the second radiation measurement procedure performed by the radiation measurement apparatus according to second embodiment are performed.

Figure 20:
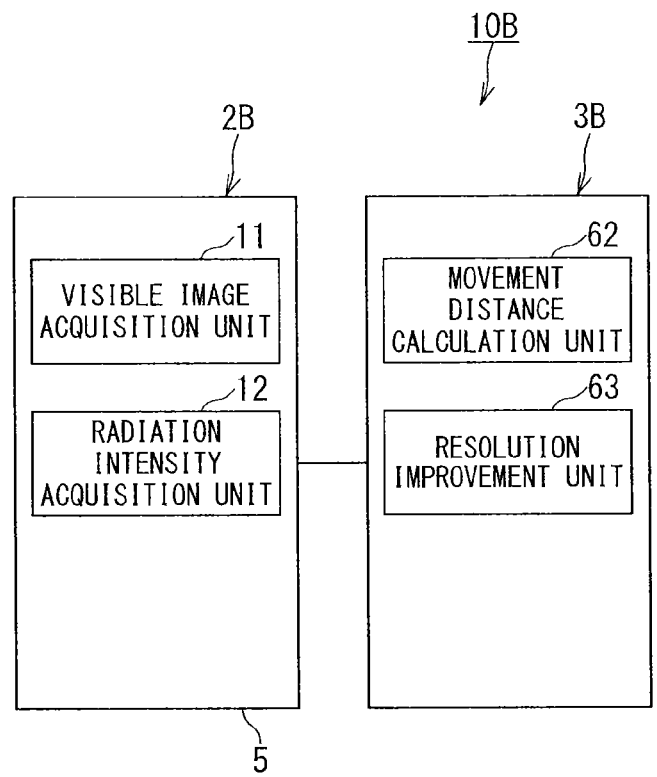

FIG. 20 is a circuit configuration diagram of another example of a radiation measurement apparatus according to second embodiment.

Figure 21:
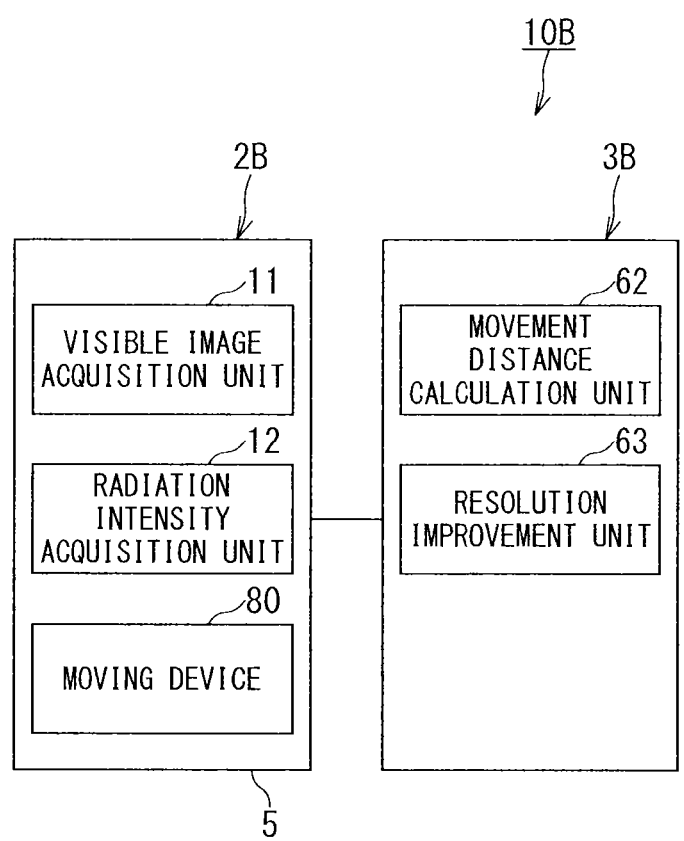

FIG. 21 is a circuit configuration diagram of still another example of a radiation measurement apparatus according to second embodiment.

Figure 22:
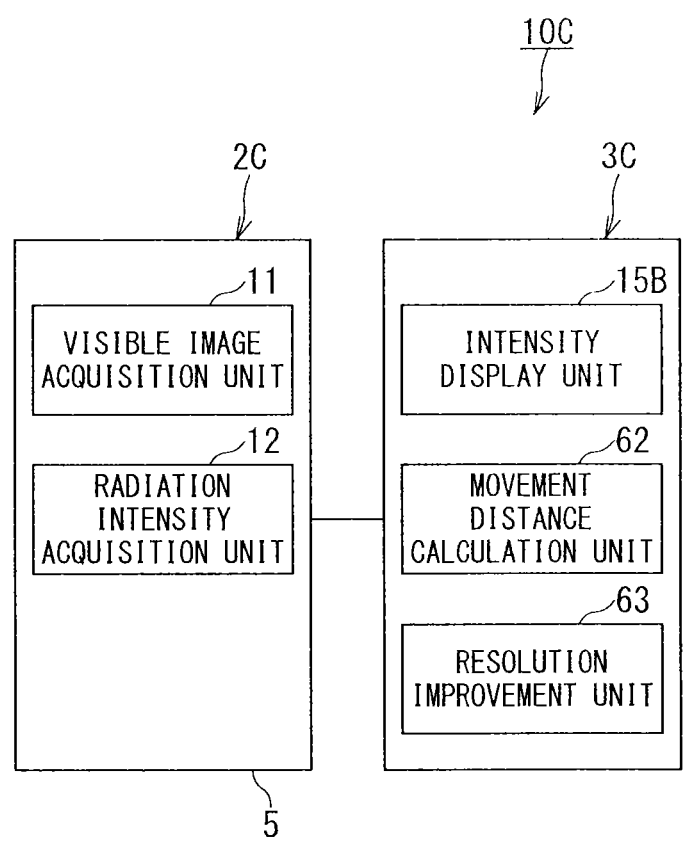

FIG. 22 is a circuit configuration diagram of another example of a radiation measurement apparatus according to embodiment.

Figure 23:
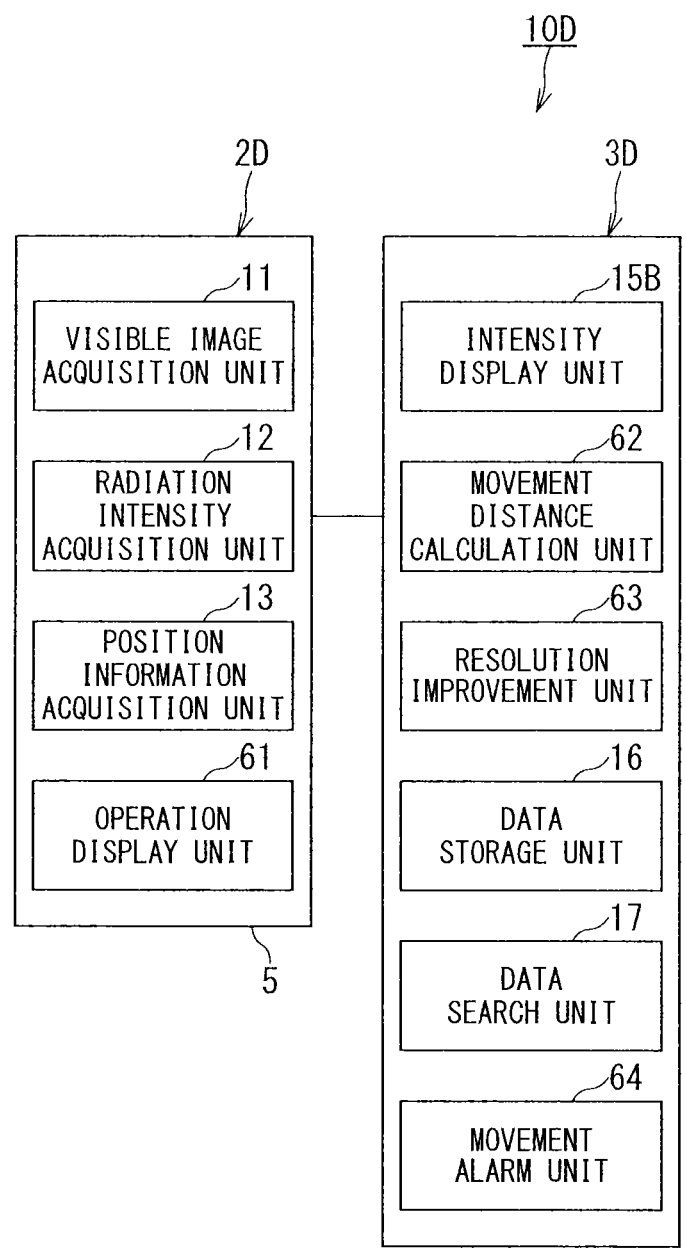

FIG. 23 is a circuit configuration diagram of still another example of the radiation measurement apparatus according to embodiment.

EMBODIMENT FOR CARRYING OUT THE INVENTION

Hereunder, embodiments of the present invention will be described with reference to the accompanying drawings.

First Embodiment

Figure 1:
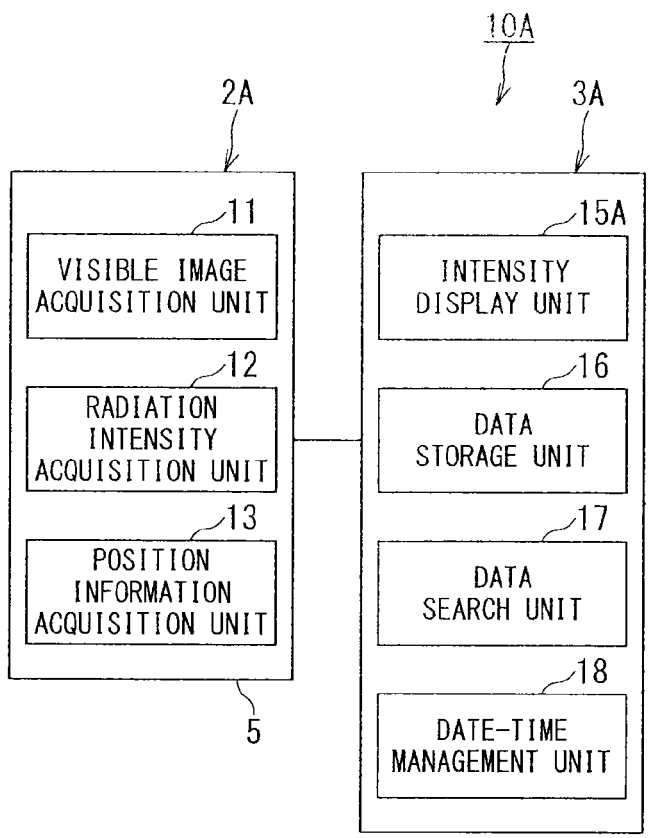
FIG. 1 is a configuration diagram of a radiation measurement apparatus according to first embodiment.

FIG. 1 is a configuration diagram of a radiation measurement apparatus 10A that is an example of a radiation measurement apparatus according to first embodiment.

The radiation measurement apparatus 10A (FIG. 1) includes a radiation detector 2A and an information processor 3A. The radiation detector 2A and the information processor 3A are connected so as to be capable of transmitting information each other.

For example, the radiation detector 2A has a visible image acquisition unit 11, a radiation intensity acquisition unit 12, and a position information acquisition unit 13. For example, the visible image acquisition unit 11, the radiation intensity acquisition unit 12, and the position information acquisition unit 13 are accommodated in a housing 5 together.

The visible image acquisition unit 11 is, for example, a camera including imaging element such as CCD (Charged Couple Device) or CMOS (Complementary Metal Oxide Semiconductor), and acquires one or more visible images. The one or more visible images acquired by the visible image acquisition unit 11 are transmitted to the information processor 3A.

The radiation intensity acquisition unit 12 measures a radiation intensity distribution on 2D (two-dimensional) plane. The radiation intensity acquisition unit 12 includes a collimator, a plurality of detection elements (detector group), and a signal substrate. The collimator and leads radiation to the detector group. In the detector group, for example, the detection elements are arranged on 2D plane or spherical surface in two-dimensional arrangement such as a matrix or the like. The detector group detect radiation such as gamma ray (γ-ray). The signal substrate processes a detection signal output from the detector group.

Figure 2:
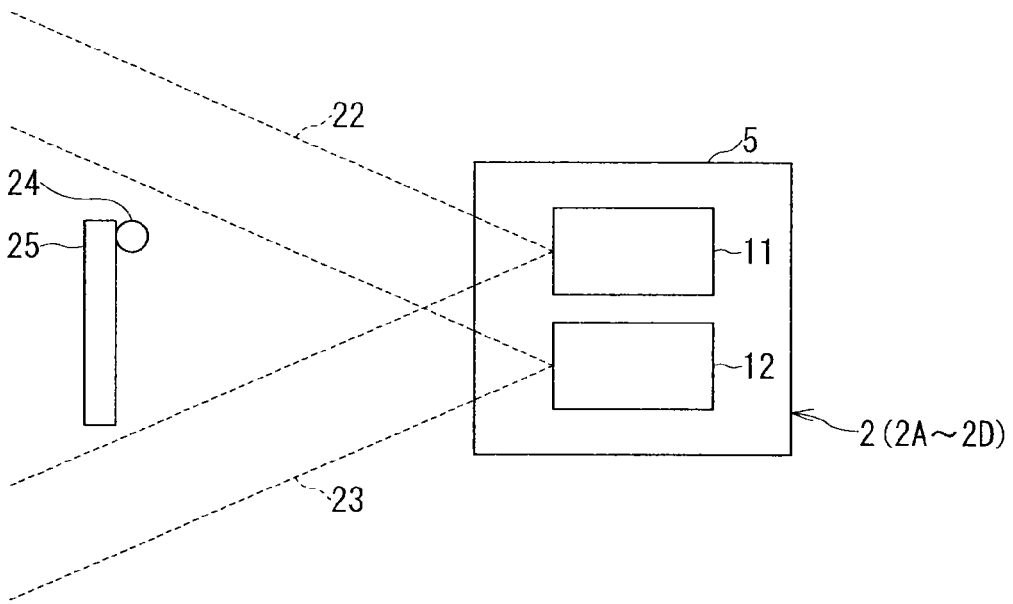
FIG. 2 is a configuration diagram of first example of a visible image acquisition unit and a radiation intensity acquisition unit, in a radiation detector included in the radiation measurement apparatus according to first embodiment.
Figure 3:
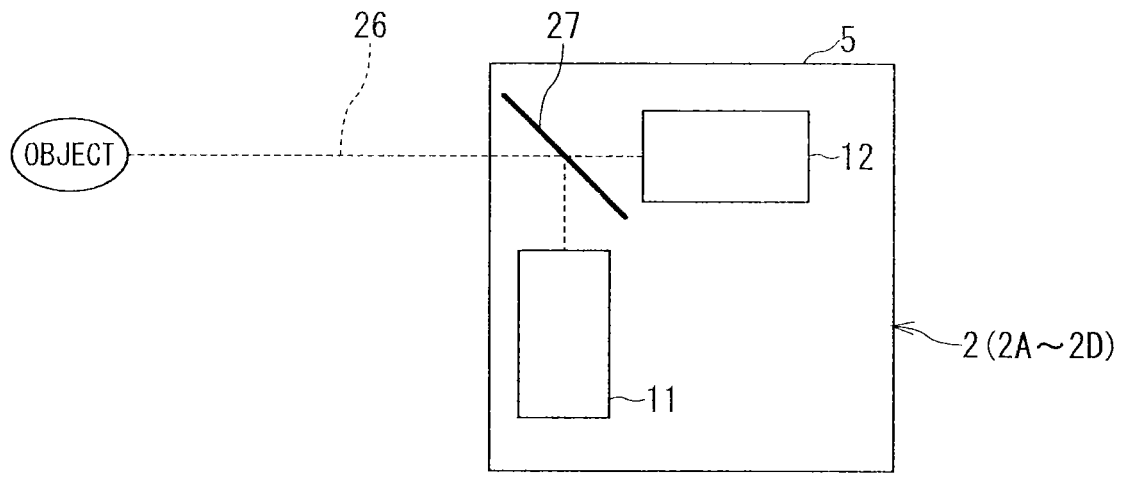
FIG. 3 is a configuration diagram of second example of a visible image acquisition unit and a radiation intensity acquisition unit, in a radiation detector included in the radiation measurement apparatus according to first embodiment.

The visible image acquisition unit 11 and the radiation intensity acquisition unit 12 are respectively configured to be possible to acquire the visible image and the radiation intensity distribution from same direction. A unit configuration of the units 11 and 12 will be described hereunder (FIGS. 2 and 3).

The position information acquisition unit 13 includes means for being possible to measure current position, such as GPS (Global Positioning System), and acquires position information of the radiation detector 2 (the visible image acquisition unit 11 and the radiation intensity acquisition unit 12).

The information processor 3A is, for example, personal computer. The information processor 3A has an intensity display unit 15A, a data storage unit 16, a data search unit 17, and a date-time management unit 18. The information processor 3A further has an input unit that and an output unit that provides user with information such as processing result. Here, for example, the output unit has at least one unit selected from a display unit that visually outputs information, a sound output unit that soundly outputs information, and a print unit that outputs information as characters.

The intensity display unit 15A allocates a plurality of colors to the radiation intensity acquired by the radiation intensity acquisition unit 12, and thereby expresses the radiation intensity by using allocated colors. The intensity display unit 15A displays the radiation intensity distribution that is expressed by using allocated colors and overlaid on the visible image. The intensity display unit 15A expresses the radiation intensity (image) by using grayscale or color (RGB) image.

When grayscale image is used for expressing the radiation intensity, the intensity display unit 15A, for example, allocates black to maximum radiation intensity and white to minimum (zero) radiation intensity, and thereby expresses the radiation intensity by using black, white, and halftone between black and white in accordance with radiation intensity value. When color image is used for expressing radiation intensity, for example, the intensity display unit 15A allocates red (R) to maximum radiation intensity, green (G) to middle radiation intensity, and blue (B) to minimum radiation intensity, and expresses radiation intensity by using red (R), green (G), blue (B), half color between red (R) and green (G), and half color between green (G) and blue (B) in accordance with radiation intensity value.

The data storage unit 16 stores various kinds of data such as visible images acquired by the visible image acquisition unit 11 or radiation intensity distribution acquired by the radiation intensity acquisition unit 12.

Further, the visible images and the radiation intensity distributions are stored in the data storage unit 16 together with information which can be search key such as date-time (date and time) information acquired from the date-time management unit 18 holding information (which will be hereinafter referred to as "date-time information") of current date-time or position information of the radiation detector 2, acquired by the position information acquisition unit 13. It is noted that the data storage unit 16 may be set so as to store the visible images and the radiation intensity distributions in predetermined storage together with either time information or position information.

The data search unit 17 extracts data stored in the data storage unit 16 on the basis of search key such as the date-time information, being input by user, and provides user with extracted data.

The data search unit 17 may be configured to extract data of which time is the closest time from time obtained by user, and display extracted data if there is not data of which time information is completely consistent with time information input by user.

The data search unit 17 may receive time information for predetermined period as search key (search condition) being input by user. In case, the data search unit 17 extracts the visible image and the radiation intensity distribution acquired on the time representing time information in sequence, and successively displays extracted visible image and extracted radiation intensity distribution. Intervals of displaying them may be arbitrarily set by user.

The date-time management unit 18 has information of current date-time (date and time). If the data storage unit 16 is set so as to store information together with date-time information in storage, as data storage setting thereof, the date-time management unit 18 transmits current date-time information to the data storage unit 16. Incidentally, display means may be provided to the radiation detector 2A. The display means may be configured to display current date-time based on the current date-time information.

Here, configurations of the acquisition units 11 and 12 in the radiation measurement apparatus according to embodiments will be described.

Since the radiation measurement apparatus according to embodiments displays image acquired by overlaying the radiation intensity distribution on the view image so that user can intuitively recognize measurement result of radiation intensity, it is required to acquire the view image taken from a direction and the radiation intensity distribution acquired from a direction substantially being equal to the direction from which the view image is taken (picked up). Thus, the visible image acquisition unit 11 and the radiation intensity acquisition unit 12 are configured as illustrated in FIGS. 2 and 3 described hereunder.

FIGS. 2 and 3 are configuration diagrams of first and second examples of the visible image acquisition unit 11 and the radiation intensity acquisition unit 12, in a radiation detector 2 (2A to 2D) included in the radiation measurement apparatus according to first embodiment.

Each of the visible image acquisition unit 11 and the radiation intensity acquisition unit 12 (FIG. 2) as first configuration are respectively accommodated in common housing 5, and are adjacently mounted as close as possible so that incoming direction of visible light is directed parallel to incoming direction of radiation. However, there is a gap between a view angle 22 of the visible image acquisition unit 11 and a view angle 23 of the radiation intensity acquisition unit 12. Therefore, in the visible image acquisition unit 11 and the radiation intensity acquisition unit 12, a calibration process is performed before a radiation measurement.

For example, a predetermined size object 25 that includes a point radiation source 24 which irradiates radiation having higher radiation intensity than peripheral environment is arranged within both view angles 22 and 23. The visible image acquisition unit 11 and the radiation intensity acquisition unit 12 sequentially acquire the visible images and the radiation intensity with reference to the object 25. The information processor 3A can accurately overlay radiation intensity distribution on visible image in accurate position based on position relation between both view angles 22 and 23 (the visible image acquisition unit 11 and the radiation intensity acquisition unit 12).

Further, the visible image acquisition unit 11 and the radiation intensity acquisition unit 12 (FIG. 3) can acquire the visible images and the radiation intensity distributions in a direction substantially being equal to a direction from which the visible images are taken (picked up) even if an influence of a parallax is not considered.

The radiation detector 2A (housing 5) has a reflector 27 that passes through radiation and reflects a visible light on a line (line of sight 26) along incident direction of radiation with respect to the radiation intensity acquisition unit 12. The visible image acquisition unit 11 is mounted in a direction of reflecting the visible light. The radiation coming from a direction of line of sight 26 passes through the reflector 27, and is thereby detected at the radiation intensity acquisition unit 12. Meanwhile, since the visible light is reflected by the reflector 27, an optical path of the visible light is changed. As a result, the visible image acquisition unit 11 acquires the visible image on the basis of the visible light reflected by the reflector 27. Next, operations of the radiation measurement apparatus 10A will be described.

Figure 4:
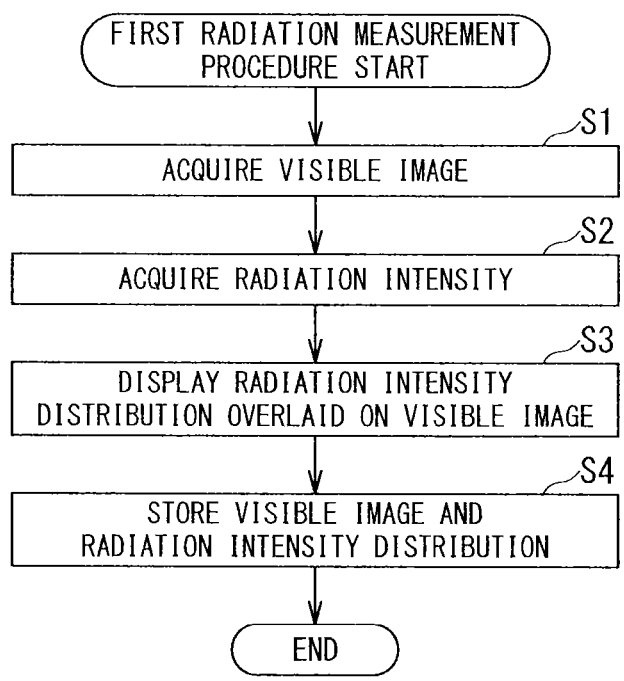
FIG. 4 is a flowchart explaining processing steps of a first radiation measurement procedure performed by the radiation measurement apparatus according to first embodiment.

FIG. 4 is a flowchart explaining processing steps (steps S1 to S4) of first radiation measurement procedure performed by the radiation measurement apparatus 10A. Namely, timings (which are hereunder illustrated in FIGS. 9, 10, and 11) when each of steps S1 to S4 is performed will be described hereunder.

The first radiation measurement procedure, for example, includes a visible image acquisition step (step S1), a radiation intensity acquisition step (step S2), an overlay processing step (step S3), and a data storing step (step S4).

In the step S1, the visible image acquisition unit 11 acquires the visible image of object to be measured at predetermined acquisition rate or arbitrary acquisition rate being set by user. The acquisition rate is set by user within a range being equal to and less than maximum acquisition rate. For example, since general video camera can acquire video (image) single having 30 frames per 1 second (30 frames/sec), the static image is acquired at acquisition rate being set within 30 frames/sec. The visible image acquisition unit 11 acquires visible images and transmits visible images acquired to the intensity display unit 15A.

Subsequently, in the step S2, the radiation intensity acquisition unit 12 acquires radiation intensity distribution being expressed as two-dimensional arrangement at predetermined acquisition rate or arbitrary acquisition rate being set by user. The radiation intensity acquisition unit 12 transmits the radiation intensity distribution to the intensity display unit 15A.

Subsequently, in the step S3, the intensity display unit 15A creates (obtains) display data (image data for display) by overlaying the radiation intensity distribution acquired in the step S2 on the visible image acquired in the step S1, and transmits the image data to display means as output unit. In the output unit, a display (an indication) based on the display data transmitted to the output unit is displayed. That is, the radiation intensity distribution is displayed with a situation where the radiation intensity distribution is overlaid on the visible image in the output unit.

The intensity display unit 15A may display a maximum value on the visible image of a place where the radiation intensity becomes the maximum value in the step S3. Display (Indication) representing maximum of the radiation intensity, such as a point, a figure, a literature, maximum value or the like can be used.

Subsequently, in the step S4, the data storage unit 16 stores the visible image 31 and the radiation intensity distribution (the distribution image 32) therein together with information such as a time and position information of each image data. The data storage unit 16 may store the displayed image 33 therein. For example, the time and position information is used as file name based on time and position representing the time and position information. A time when acquisition step is started or completed is used as the time information. If format of each data stored in the data storage unit 16 is JPEG format, the position information may be further written in EXIF (Exchangeable Image Format) and be thereby managed as image property.

The data search unit 17 arbitrarily extracts various data stored in the data storage unit 16 in the step S4 based on the time or position information. Since the data storage unit 16 stores each of data together with the time or position information therein, it becomes easy for the data search unit 17 to perform ex-post facto data search (extraction) from data stored in the data storage unit 16. A storing timing of each various data will be described (FIGS. 9, 10, and 11).

If the step S4 is completed, all processing steps of the first radiation measurement procedure are completed, hence the first radiation measurement procedure is finished (END).

Namely, although the first radiation measurement procedure above-described includes the data storing step (step S4), the first radiation measurement procedure does not necessarily include the data storing step. For example, in case of performing the first radiation measurement procedure by using radiation measurement apparatus 10A does not include the data storage unit 16, the data storing step may be omitted.

Next, the overlay processing step (step S3) that overlays an image (which will be hereinafter referred to as "distribution image") 32 of the radiation intensity distribution on the visible image 31 and will be described in detail.

Figure 5A:
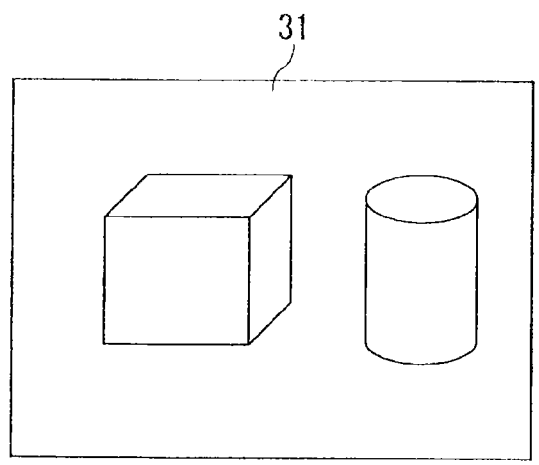
FIG. 5A is an explanation diagram illustrating an example of a visible image.
Figure 5B:
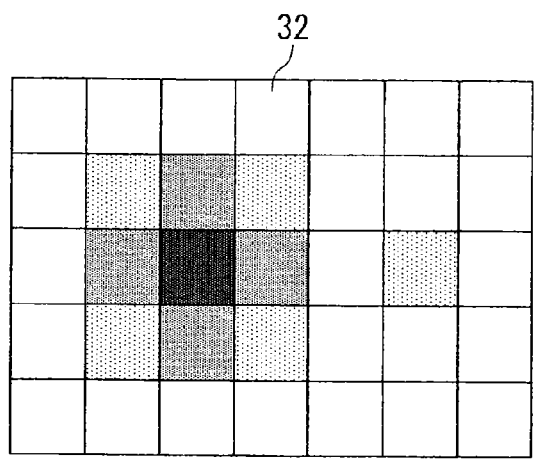
FIG. 5B is an explanation diagram illustrating an example of a distribution image.
Figure 5C:
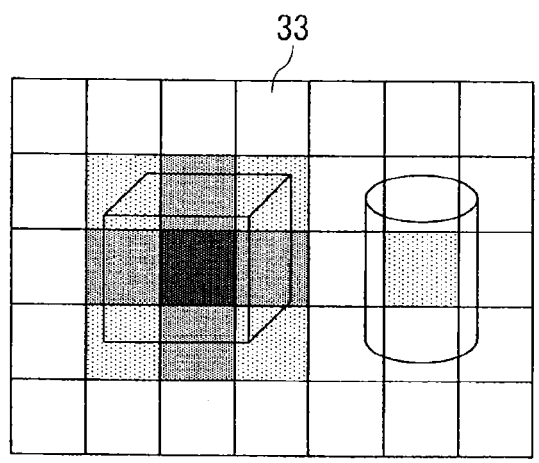
FIG. 5C is an explanation diagram illustrating an example of displayed image which is acquired by overlaying the distribution image on the visible image.

FIG. 5 (which includes FIGS. 5A to 5C) is an explanation diagram explaining contents of overlaying processing step (step S3). FIG. 5A is an explanation diagram illustrating an example of the visible image 31, FIG. 5B is an explanation diagram illustrating an example of the distribution image 32, and FIG. 5C is an explanation diagram illustrating an example of a displayed image 33 which is created (obtained) by overlapping the visible image 31 and the distribution image 32.

For example, the intensity display unit 15A creates image data of the displayed image 33 illustrated in FIG. 5C by overlaying the distribution image 32 (image of radiation intensity distribution) which is converted into two-dimensional static image and is illustrated in FIG. 5B on the visible image 31 illustrated in FIG. 5A. After the image data of the displayed image 33 is provided to output (display) element, the displayed image 33 is displayed in the output element. Incidentally, the image data of the displayed image 33 can be acquired by performing overlay operation (calculation) of the distribution image 32 with respect to the visible image 31.

Further, for the sake of acquiring the distribution image 32, the intensity display unit 15A converts two-dimensional arrangement of radiation intensity distribution into two-dimensional static image.

In an example illustrated in FIG. 5B, the intensity display unit 15A expresses the radiation intensity distribution by using grayscale (monochrome). In the example illustrated in FIG. 5B, if radiation intensity becomes weaker, display (indication) in accordance with radiation intensity becomes closer from white. Meanwhile, if radiation intensity becomes stronger, display (indication) in accordance with radiation intensity becomes closer from black. The intensity display unit 15A displays radiation intensity by using color instead of monochrome, and can thereby expand range which user can recognize the radiation intensity in comparison with a case where grayscale is used. An example which allocates some colors to radiation intensity will be described hereunder (FIGS. 6 to 8).

Further, the intensity display unit 15A may display the visible image 31 as monochrome image, the distribution image 32 as color image. In this case, a visibility in the intensity display unit 15A can be improved without mutually interfering with the visible image 31 and the distribution image 32.

Furthermore, in case of displaying image displayed in the intensity display unit 15A as display means, the intensity display unit 15A may have a function of selecting one as image displayed in the intensity display unit 15A from the visible image 31, the distribution image 32, and the displayed image 33 (which is created by overlaying the distribution image 32 on the visible image 31).

Subsequently, a color assignment of radiation intensity distribution, performed by the intensity display unit 15A will be described. For the sake of simplifying explanation, a description described hereunder explains a case where the radiation intensity distribution is one dimensional distribution as an example.

FIG. 6 (which includes FIGS. 6A and 6B), FIG. 7 (which includes FIGS. 7A and 7B), and FIG. 8 (which includes FIGS. 8A and 8B) are explanations diagram explaining allocation of colors with respect to radiation intensity distribution performed by the intensity display unit 15A.

For detail, FIGS. 6A, 7A, and 8A are the explanation diagram illustrating the radiation intensity distribution in x axis direction. FIG. 6B is the explanation diagram illustrating color allocation of the radiation intensity distribution, based on a maximum value of radiation intensity. FIG. 7B is the explanation diagram illustrating color allocation of the radiation intensity distribution, based on a user maximum value 43 set by user. FIG. 8B is the explanation diagram illustrating color allocation of the radiation intensity distribution, based on an average value of radiation intensity.

For example, if the radiation intensity distribution in a direction along x axis illustrated in FIG. 6A is transmits to the intensity display unit 15A, the intensity display unit 15A extracts the maximum value 41 from the radiation intensity distribution and decides color allocation (coloration) 42 to the radiation intensity (FIG. 6B) based on the maximum value 41 extracted by the intensity display unit 15A.

In case of using grayscale, the intensity display unit 15A allocates black as first color representing strongest radiation intensity to maximum value 41, and white to radiation intensity being zero. In case of using color, the intensity display unit 15A allocates red to maximum value 41, and blue to radiation intensity being zero.

Further, the intensity display unit 15A may use a value 43 (which will be hereinafter referred to as "user maximum value") which is arbitrarily set by user as maximum value of radiation intensity for allocating colors to radiation intensity instead of maximum value 41, and decide color allocation to the radiation intensity (FIG. 7B) based on the user maximum value 43.

For example, if the radiation intensity distribution in a direction along x axis illustrated in FIG. 7A is transmits to the intensity display unit 15A and the user maximum value 43 is set, the intensity display unit 15A decides color allocation 44 to the radiation intensity (FIG. 7B) based on the user maximum value 43. For example, the intensity display unit 15A allocates black representing radiation intensity being stronger than radiation intensity of which value is equal to the user maximum value 43, and evenly allocates other colors to radiation intensity of which value is larger than zero.

Further, the intensity display unit 15A may use an average value (FIG. 8B) of radiation intensity for allocating colors to radiation intensity instead of maximum value 41 (FIG. 6B) or user maximum value 43 (FIG. 7B).

For example, if the radiation intensity distribution in a direction along x axis illustrated in FIG. 8A is transmits to the intensity display unit 15A and the average value of the radiation intensity is used, the intensity display unit 15A calculates the average value "$\mu$" of the radiation intensity. The intensity display unit 15A uses the average value "$\mu$" as a threshold value 45 for displaying the radiation intensity, and decides color allocation (coloration) 46 with respect to a cell representing radiation intensity of which value is equal to and less than the threshold value 45 so as not to display the cell representing radiation intensity of which value is equal to and less than the threshold value 45 in the intensity display unit 15A. That is, the radiation intensity which is not larger than the threshold value 45 is not considered when the distribution image 32 is created.

When the distribution image 32 is created, since the radiation intensity which is not larger than the threshold value 45 is ignored, at a place where radiation intensity is weak, only the visible image 31 is displayed. As a result, since the displayed image 33 of the visibility is improved, user can easily recognize a direction being high radiation intensity.

Incidentally, instead of the average value "$\mu$", a value being predetermined percentage of maximum value may be used as the threshold value 45. For example, if there is a pinpoint area (hotspot) of which radiation intensity is high in a field of view, there is a case where the average value "$\mu$" is affected by the radiation intensity in the pinpoint area, and thereby increases. In this case, if the average value "$\mu$" is used as the threshold value 45, most of area excluding the pinpoint area are displayed. Thus, if the value being predetermined percentage of maximum value is used as the threshold value 45 which is less than the average value "$\mu$", a range displayed in intensity display unit 15A is flexibly increased (expanded) even if there is the hotspot in a field of view. The threshold value 45 may be arbitrarily set by user.

Next, a timing when each of processing steps (steps S1 to S4) in the first radiation measurement procedure is performed will be described.

Next, FIG. 9 is a timeline explaining a first timing example in a case where processing steps (steps S1 to S4) of the first radiation measurement procedure are performed.

An acquisition rate 51 (image acquisition rate 51) of visible image in the visible image acquisition step (step S1) and an acquisition rate 52 (intensity acquisition rate 52) of the radiation intensity distribution in the radiation intensity acquisition step (step S2) can arbitrarily be set by user. Provided that the image acquisition rate 51 can be set so as not to be less than a necessary time 53 (image necessary acquisition time 53) for acquiring the visible image in the visible image acquisition step (step S1), and the intensity acquisition rate 52 can be set so as not to be less than a necessary time 54 (intensity necessary acquisition time 54) for acquiring the radiation intensity distribution.

In the case, since the image acquisition rate 51 is larger than the intensity acquisition rate 52, the overlay processing step (step S3) and the data storing step (step S4) are performed in accordance with the image acquisition rate 51 being larger one of the image acquisition rate 51 and the intensity acquisition rate 52.

In general, the image necessity acquisition time 53 is shorter than the intensity necessity acquisition time 54. Accordingly, if the step S4 is performed in synchronization with the image acquisition rate 51, information of radiation intensity is redundantly stored in the data storage unit 16. As a result, redundant storing operation causes storage capacity of the data storage unit 16 to be increased. In this case, it is preferable that the step S4 is performed with a timing illustrated in FIG. 10 which is described hereunder.

FIG. 10 is a timeline explaining a second timing example in a case where processing steps (steps S1 to S4) of the first radiation measurement procedure are performed.

In the second timing, the visible image acquisition step (step S1) is performed in synchronization with a time when the radiation intensity acquisition step (step S2) is started. Further, when the radiation intensity acquisition step is completed, the overlay processing step (step S3) and the data storing step (step S4) are simultaneously started and performed.

If each processing step (steps S1 to S4) in the first radiation measurement procedure is performed with the second timing as above-described, used amount of storage capacity in the data storage unit 16 can keep to a necessary minimum amount.

Further, as illustrated in FIG. 11, the overlay processing step (step S3) may be performed in synchronization with the image acquisition rate 51, and the data storing step (step S4) may be performed in synchronization with the intensity acquisition rate 52.

FIG. 10 is a timeline explaining a third timing example in a case where processing steps (steps S1 to S4) of the first radiation measurement procedure are performed.

If each processing step in the first radiation measurement procedure is performed with the third timing as above-described, a display rate of the displayed image 33 is performed without feeling a discomfort. Meanwhile, since the data storing step is performed in synchronization with the intensity acquisition rate 52 being less one of the acquisition rates 51 and 52, a spending volume required for storing data can be suppressed.

Further, in a case where there is a difference between a start timing of the visible image acquisition step (step S1) and a start timing of the radiation intensity acquisition step (step S2), caused by the difference between the visible image acquisition rate and the radiation intensity acquisition rate, the visible image acquisition step (step S1b) is performed in synchronization with a time when the radiation intensity acquisition step (step S2b) is started. Therefore, the radiation measurement apparatus 10A can display with overlaying the radiation intensity on the visible image of which the acquirement start time is synchronized with the acquirement start time of the radiation intensity.

The radiation measurement apparatus 10A can display the displayed image 33 acquired by overlaying the distribution image 32 of the radiation intensity on the visible image 31 being acquired simultaneously with the distribution image 32. Therefore, the radiation measurement apparatus 10A relates user's real field of view to the radiation intensity, and thereby enables user to intuitively recognize incoming direction of radiation which has high radiation intensity.

Further, since the radiation measurement apparatus 10A accurately relates the view angle of the visible image acquisition unit 11 that acquires the visible images to the view angle of the radiation intensity acquisition unit 12 that acquires the radiation intensity, and accurately synchronizes the acquisition timing of each of data. Therefore, the radiation measurement apparatus 10A can provide user with accurate radiation intensity information.

Further, since the radiation measurement apparatus 10A holds data obtained by performing radiation measurement together with the time information and the position information, trace of obtained data can be easy. Therefore the radiation measurement apparatus 10A can improve a traceability of obtained data.

Furthermore, when user works under radiation environment, user takes the radiation measurement apparatus 10A, measures radiation intensity with displaying measurement result on own display unit, and thereby enables user to intuitively determine whether a place where user works is safe for user or not. As a result, the radiation measurement apparatus 10A makes it easy to manage safe of operator. Further, the radiation measurement apparatus 10A makes it easy to visually determine that a direction and/or a member, of irradiating a radiation of which radiation dose is high, and can thereby make it easy for user to built effective shield.

Incidentally, since the radiation measurement apparatus 10A above-mentioned that is an example of a radiation measurement apparatus according to first embodiment, the radiation measurement apparatus 10A is necessarily not limited to a configuration illustrated in FIG. 1. For example, as illustrated in FIG. 12, the radiation measurement apparatus 10A may be configured by the radiation detector 2A that omits the position information acquisition unit 13 from the radiation detector 2A illustrated in FIG. 1 and the information processor 3A that omits the data storage unit 16, the data search unit 17, and the date-time management unit 18 from the information processor 3A illustrated in FIG. 1.

That is, as far as the radiation measurement apparatus 10A includes the radiation detector 2A that at least has the visible image acquisition unit 11 and the radiation intensity acquisition unit 12, and the information processor 3A that at least has the intensity display unit 15A, the radiation measurement apparatus 10A may arbitrarily be configured.

Further, the radiation measurement apparatus 10A may include the radiation detector 2A having a part or whole of the information processor 3A as a configuration example. The configuration example can be adopted in above-mentioned another (second) embodiment or other examples as well as in the radiation measurement apparatus 10A.

Second Embodiment

FIG. 13 is a configuration diagram of a radiation measurement apparatus 10B that is an example of a radiation measurement apparatus according to second embodiment.

The radiation measurement apparatus 10B as the example of the radiation measurement apparatus according to second embodiment is different from the radiation measurement apparatus 10A in that the radiation measurement apparatus 10B includes a radiation detector 2B and an information processor 3B instead of the radiation detector 2A and the information processor 3A. Meanwhile, the radiation measurement apparatus 10B is not substantially different from the radiation measurement apparatus 10A in the other points. Thus, in description of the second embodiment, the same reference numerals or characters in the radiation measurement apparatus 10B are assigned to the same or similar components and parts as those in the radiation measurement apparatus 10A, and the duplicated description thereof is omitted.

For example, the radiation detector 2B has the visible image acquisition unit 11, the radiation intensity acquisition unit 12, and an operation display unit 13. For example, the visible image acquisition unit 11, the radiation intensity acquisition unit 12, and the operation display unit 13 are accommodated in a housing 5 together.

In the radiation detector 2B, the visible image acquisition unit 11 acquires a video signal, and then acquires static images (freeze-frames) by freezing the video signal. The static images are successively transmitted from the visible image acquisition unit 11 to a movement distance calculation unit 62. Further, the radiation intensity distribution acquired as a result of measurement performed by the radiation intensity acquisition unit 12 is successively transmitted to a resolution improvement unit 63.

The radiation intensity acquisition unit 12 acquires the radiation intensity distribution 32 (FIG. 5B) which has lower resolution than resolution of the visible image 31 (FIG. 5A) acquired by the visible image acquisition unit 11.

In general, if a number of detection elements are arranged in the radiation intensity acquisition unit 12, cost of the apparatus tends to increase, and size of the apparatus tends to enlarge. Therefore, it is often that the detection elements are arranged in a state where the arrangement number of the detection elements is limited. As a result, it is often that the distribution image 32 can be acquired with a space resolution being lower than a space resolution of the visible image 31.

Meanwhile, in the radiation detector 2 (2A and 2B) of the radiation measurement apparatus according to embodiments, as illustrated in above-described FIGS. 2 and 3, since the visible image acquisition unit 11 and the radiation intensity acquisition unit 12 are configured so that the visible images and the radiation intensity distributions in a direction substantially being equal to a direction from which the visible images are taken can be acquired, the radiation detector 2 can make a cell of the radiation intensity distribution (image) 32 responsive to a coordinate on the visible image 31 as with the displayed image 33 (FIG. 5C). That is, the radiation detector 2 enables one (1) cell of the distribution image 32 to correspond to N×N (N>1) pixels of the visible image 31.

The operation display unit 61 (operational state inform unit) monitors an operational state of the radiation intensity acquisition unit 12, displays the operational state, and thereby provides user with the operational state. Incidentally, the operation display unit 61 may inform user by sound notifying user of operational state instead of indication.

The information processor 3B is, for example, personal computer. The information processor 3B has an intensity display unit 15B, the movement distance calculation unit 62, the resolution improvement unit 63, the data storage unit 16, and a movement alarm unit 64. The information processor 3B further has an input unit that and an output unit that provides user with information such as processing result.

The intensity display unit 15B is different from the intensity display unit 15A that allocates a plurality of colors to the radiation intensity acquired by the radiation intensity acquisition unit 12, and thereby expresses the radiation intensity by using allocated colors in that the intensity display unit 15B further having a function that allocates a plurality of colors to the radiation intensity distribution (high resolution intensity distribution) of which resolution is improved by the resolution improvement unit 63, and thereby expresses the radiation intensity by using allocated colors. However, the intensity display unit 15B is configured as the same conditions as the intensity display unit 15A except of further having the resolution improvement function.

For example, the intensity display unit 15B can be acquired by performing overlay operation (calculation) of an image of the high resolution intensity distribution, and express the high resolution intensity distribution (image) by using grayscale or color (RGB) image in accordance with radiation intensity value. The intensity display unit 15B can express the high resolution intensity distribution (image) by using grayscale or color (RGB) image, and thereby provides user with the high resolution intensity distribution having higher resolution than original (the distribution image 32) together with the visible image in a state where the high resolution intensity distribution has good visibility.

The movement distance calculation unit 62 calculates a movement distance (movement quantity) between visible images that are successively acquired by the visible image acquisition unit 11.

The resolution improvement unit 63 acquires the radiation intensity distribution (image) (which will be hereinafter referred to as "high resolution intensity distribution") having higher resolution than original (the distribution image 32) by moving (shifting) one of the radiation intensity distributions that is nearly simultaneously acquired with the visible images the movement distance (movement quantity) calculated by the movement distance calculation unit 62 and overlaying one radiation intensity distribution on the other radiation intensity distribution.

The data storage unit 16 stores the visible images and the radiation intensity distributions therein together with the movement distance during single-measurement performed by the radiation intensity acquisition unit 12.

The movement alarm unit 64 determines whether the movement distance calculated by the movement distance calculation unit 62 when the radiation intensity acquisition unit 12 measures the radiation intensity, exceeds threshold value which is a maximum movement distance in a range where the resolution improvement unit 63 can acquire the high resolution intensity distribution. If the movement alarm unit 64 determines the movement distance is larger than the threshold value, the movement alarm unit 64 provides user with warning. In order to provide user with warning, for example, the information processor 3B displays result determined by the movement alarm unit 64 together with measurement result of the radiation intensity distribution in display means such as own display unit, or outputs sound such as an alarm. Next, operations of the radiation measurement apparatus 10B will be described.

FIG. 14 is a flowchart explaining processing steps (steps S1, S2, S11, S12, S3, and S4) of a second radiation measurement procedure performed by the radiation measurement apparatus 10B.

The second radiation measurement procedure is different from the first radiation measurement procedure in that the second radiation measurement procedure further includes steps (steps S11 and S12) as to a resolution improvement process that improves resolution of the radiation intensity distribution, the radiation intensity distribution that becomes overlay object (which denotes object to be overlaid before the overlay processing step is performed or overlaid object after the overlay processing step is performed), and data that becomes storage object (which denotes object to be stored before the data storing step is performed and stored object after the data storing step is performed). Meanwhile, the second radiation measurement procedure is not substantially different from the first radiation measurement procedure in the other points. Thus, in description of the second radiation measurement procedure, the same step number in the second radiation measurement procedure are assigned to the same or similar steps as those in the first radiation measurement procedure, and the duplicated description thereof is omitted.

The second radiation measurement procedure, for example, includes the visible image acquisition step (step S1), the radiation intensity acquisition step (step S2), the resolution improvement process (steps S11 and S12) having a movement distance calculation step (step S11) and a high resolution intensity distribution acquisition step (step S12), an overlay processing step (step S13), and a data storing step (step S14).

In the second radiation measurement procedure, if the second radiation measurement procedure starts, at first, the steps S1 and S2 is performed. The visible image acquisition unit 11 acquires the visible images in the step S1. The radiation intensity acquisition unit 12 acquires radiation intensity distributions in the step S2. The visible images acquired by the visible image acquisition unit 11 are transmitted to the intensity display unit 15B. The radiation intensity distributions acquired by the radiation intensity acquisition unit 12 are transmitted to the resolution improvement unit 63.

Following the step S2, the movement distance calculation step (step S11) in the resolution improvement process is performed. In the step S11, the movement distance calculation unit 62 successively calculates the movement distance of the radiation detector 2B (the visible image acquisition unit 11).

Following the movement distance calculation step (step S11), the high resolution intensity distribution acquisition step (step S12). In the step S12, plural radiation intensity distributions being acquired nearly simultaneously with the visible images used in the movement distance calculation step (step S11) are overlaid by the resolution improvement unit 63 with a situation where the movement distance calculated in the step S11 is shifted, thereby being acquired the high resolution intensity distribution.

Following the high resolution intensity distribution acquisition step (step S12), the overlay processing step (step S13) is performed. In the step S13, the intensity display unit 15B creates (obtains) display data (image data for display) by overlaying the high resolution intensity distribution acquired in the step S12 on the visible image acquired in the step S1, and transmits the image data to the output unit. Then, in the display as the output unit, a display (an indication) based on the display data transmitted to the output unit. That is, the high resolution intensity distribution is displayed with a situation where the high resolution intensity distribution is overlaid on the visible image in the output unit.

Following the overlay processing step (step S13), the data storing step (step S14) is performed. In the step S14, the data storage unit 16 stores the visible images and the radiation intensity distributions therein together with the movement distance during single-measurement performed by the radiation intensity acquisition unit 12.

If the step S14 is completed, all processing steps of the second radiation measurement procedure are completed, hence the second radiation measurement procedure is finished (END).

Next, more detailed contents of process performed in the resolution improvement step (steps S11 and S12) will be described.

FIG. 15 is an explanation diagram of two visible images 31a and 31b successively acquired in the radiation detector 2B. FIG. 16 is an explanation diagram explaining a case where the movement distance calculation unit 62 calculates from two visible images 31a and 31b successively acquired in the radiation detector 2B.

In the resolution improvement process, it is assumed that user carries the radiation detector 2B and measures radiation by using the radiation detector 2B. Further, it is assumed that an acquired objection (a field of view: FOV) of the visible images 31a and 31b (and radiation intensities) changes as illustrated in FIG. 15 by using so-called "hand movement (camera shake)".

As illustrated in FIG. 16, the movement distance calculation unit 62 sets at least one comparison region 72 to compare the visible image 31a with the visible image 31b on the visible image 31a. The movement distance calculation unit 62 scans the comparison region 72 with respect to the visible image 31b in a direction of arrow L illustrated in FIG. 16 with each completion of one-pixel shift. The movement distance calculation unit 62 performs a matching process which calculates a correlative value of brightness in each position of the comparison region 72. The movement distance calculation unit 62 calculates a gap quantity between the visible images 31a and 31b when the brightness correlation value becomes maximum value in the matching process, as movement distance.

FIG. 17 is an explanation diagram explaining positional relation of two visible images 31a and 31b when correlation value becomes maximum value. FIG. 18 (which includes FIGS. 18A and 18B) is an explanation diagram explaining a case where radiation intensity distribution (high resolution intensity distribution) 75 having twice as high resolution as resolution of original radiation intensity distribution is created. FIG. 18A is an explanation diagram explaining a state before two radiation intensity distributions 73a and 73b are overlapped. FIG. 18B is an explanation diagram explaining a state after two radiation intensity distributions 73a and 73b are overlapped.

The movement distance calculation unit 62 calculates a gap quantity x1 (FIG. 17) as movement distance in x axis direction and a gap quantity y1 (FIG. 17) as movement distance in y axis direction. A unit of the gap is the number of pixels (pixel number).

The resolution improvement unit 63 overlaps a plurality of (two) radiation intensity distributions which are acquired nearly simultaneously with the visible images 31 (31a and 31b) used in a case where the movement distance calculation unit 62 calculates the movement distance, and thereby acquires the high resolution intensity distribution 75.

For example, if an example illustrated in FIG. 17 is explained, the resolution improvement unit 63 uses the movement distance calculated by the movement distance calculation unit 62, i.e., the gap quantities x1 and y1, and thereby overlays one of two (plural) radiation intensity distributions on the other of them.

If the resolution improvement unit 63 can shift the radiation intensity distribution by a unit being smaller than one cell of the radiation intensity distribution, i.e., pixel unit of the visible image by using space resolution differences between the visible image and the radiation intensity distribution, and can then overlay one radiation intensity distribution on a radiation intensity distribution other than the one radiation intensity distribution, the resolution improvement unit 63 creates the radiation intensity distribution (which will be hereinafter referred to as "high resolution intensity distribution") 75 which is expressed by a cell (which will be hereinafter referred to as "high resolution cell") 76 being smaller than the original cell of the radiation intensity distribution.

When two radiation intensity distributions 73a and 73b are overlaid each other, the high resolution cell 76 in the high resolution intensity distribution 75 of which space resolution is improved, has two intensity values of the original cells 74a and 74b.

In this case, the resolution improvement unit 63 calculates, for example, average intensity (average value of intensity) of two original cells 74a and 74b, whereby the intensity value of the high resolution cell 76 can be most easily specified (calculated). Needless to say, the resolution improvement unit 63 may decide the intensity value of the high resolution cell 76 having plural intensity values by other ways than the way of calculating average of the intensity values of the original cells 74a and 74b.

Next, the operation display unit 61 and the movement alarm unit 64 will be described.

Normally, the radiation intensity acquisition unit 12 measures radiation by waiting radiation incoming from measurement direction a predetermined time and then counting quantity of incoming radiation. Therefore, if a direction to which the radiation intensity acquisition unit 12 faces is changed on the radiation measurement, the radiation intensity acquisition unit 12 cannot precisely count quantity of incoming radiation from the same direction. Therefore, the radiation intensity distribution acquired by measuring radiation while user takes the radiation detector 2B significantly decreases reliability thereof. Further, even if the radiation intensity distribution of which reliability is significantly decreased is input to the resolution improvement unit 63, the resolution cannot be normally improved.

Here, FIG. 19 is a timeline explaining a timing example when processing steps (steps S1 and S2) of the second radiation measurement procedure performed by the radiation measurement apparatus according to second embodiment are performed.

Generally, the intensity necessity acquisition time 54 that is the necessary time in a case where the radiation intensity acquisition unit 12 acquires the radiation intensity distribution is longer than the image necessity acquisition time 53 that is the necessary time in a case where the visible image acquisition unit 11 acquires the visible image.

As illustrated in FIG. 19, in the visible image acquisition step (step S1), the visible image acquisition unit 11 needs the image necessary acquisition time 53 for the sake of acquiring the visible image at the image acquisition rate 51. Here, if popular camera is applied to the visible image acquisition unit 11, the image necessary acquisition time 53 corresponds to exposure time.

Meanwhile, in the radiation intensity acquisition step (step S2), the radiation intensity acquisition unit 12 acquires radiation intensity in the intensity acquisition rate 52, and therefore needs the intensity necessity acquisition time 54. That is, the intensity acquisition rate 52 and the intensity necessity acquisition time 54, in the step S2 is longer than the image acquisition rate 51 and the image necessary acquisition time 53, in the step S1.

Here, times excluding the necessary acquisition times 53 and 54 in the acquisition rates 51 and 52 corresponds to data transfer time. That is, since the radiation intensity acquisition unit 12, there is no problem with moving the radiation detector 2B on the data transfer time.

Therefore, the operation display unit 61 monitors the operational state of the radiation intensity acquisition unit 12 and displays the operational state for user. For example, the operation display unit 61 displays a message such as "now measuring" or "now data transferring" in the radiation detector 2B, or the message together with the visible image and the radiation intensity distribution in the display unit of the information processor 3B.

User can determine whether the radiation detector 2B can be moved or not. As a result, the radiation measurement apparatus 10B can prevent unnecessary movement, and therefore acquire the radiation intensity distribution with better accuracy.

Furthermore, in a case where the movement distance of the radiation intensity acquisition unit 12 exceeds the threshold value, the movement alarm unit 64 outputs the alarm to user, and thereby notifies user whether there is data reliability or not. Concretely, the movement distance calculation unit 62 successively calculates the movement distance in measuring radiation intensity in synchronization with the image acquisition rate 51 by using a difference between the image acquisition rate 51 and the intensity acquisition rate 52. The movement alarm unit 64 acquires the movement distance calculated by the movement distance calculation unit 62 from the movement distance calculation unit 62.

The movement alarm unit 64 monitors whether the movement distance acquired by the movement distance calculation unit 62 exceeds the than the threshold value. The movement alarm unit 64 may be configured to enable user to arbitrarily set the threshold value. As general threshold value, if N is the pixel number of the visible image corresponding to one cell of the radiation intensity distribution, the threshold value is preferable to be less than N/2.

In a case where the movement distance being larger (longer) than the threshold value is detected, the movement alarm unit 64 outputs an alarm notifying user a situation where the movement distance of the radiation intensity acquisition unit 12 (the radiation measurement apparatus 10B) exceeds than the threshold value. The movement alarm unit 64 allows the information processor 3B to display the alarm together with the visible image and the radiation intensity distribution in own display unit, or to output alarm sound. While user can check whether the radiation intensity distribution currently acquired by the radiation intensity acquisition unit 12 is reliable by only checking whether there is the alarm or not, user can perform the measurement operation.

Further, the movement alarm unit 64 enables the resolution improvement unit 63 to only collect the radiation intensity distribution acquired when the movement distance does not exceed the threshold value, by excluding the radiation intensity distribution acquired when the movement distance of the radiation intensity acquisition unit 12 exceeds the threshold value as well as to notify user the situation where the movement distance of the radiation intensity acquisition unit 12 (the radiation measurement apparatus 10B) exceeds than the threshold value. That is, the resolution improvement unit 63 acquires the high resolution intensity distribution by using the radiation intensity distribution acquired when the movement distance does not exceed the threshold value. Meanwhile, the resolution improvement unit 63 does not acquire the high resolution intensity distribution when the movement distance exceeds the threshold value.

As a result, the radiation measurement apparatus 10B only use accurate radiation intensity distribution, and can thereby improve the space resolution of the radiation intensity distribution. In addition, user can measure radiation intensity without paying attention to an effect on measurement accuracy caused by moving the radiation measurement apparatus 10B.

Accordingly, the radiation measurement apparatus 10B includes the movement alarm unit 64, and therefore use the movement distance as an index showing liability of radiation intensity distribution measured by the radiation measurement apparatus 10B.

As described above, the radiation measurement apparatus 10B can improve the space resolution of the radiation intensity distribution without increasing the arrangement number of radiation detectors, and thereby acquire the radiation intensity distribution with better accuracy without losing portability. Therefore, the radiation measurement apparatus 10B can improve resolution as well as portability.

Further, the radiation measurement apparatus 10B can acquire the radiation intensity distribution that is preferable to improve the space resolution of the radiation intensity distribution by using the movement distance of the radiation measurement apparatus 10B (the visible image acquisition unit 11 and the radiation intensity acquisition unit 12) as an index. The radiation measurement apparatus 10B can preferably notice user of the reliability of the radiation intensity distribution as measurement result.

Furthermore, the radiation measurement apparatus 10B can quantify the reliability of the radiation intensity distribution by using the movement distance. Since the radiation measurement apparatus 10B stores the visible images and the radiation intensity distribution together with the movement distance, the radiation measurement apparatus 10B enables user to select the radiation intensity distribution that is preferable to improve the space resolution by using the index even if the radiation measurement has completed. Therefore, the radiation measurement apparatus 10B can anew improve the space resolution of the radiation intensity distribution even if the radiation measurement has completed.

Incidentally, the radiation measurement apparatus 10B described above is merely an example of the radiation measurement apparatus according to second embodiment. Therefore, it is not necessarily limited to configuration illustrated in the accompanying drawings such as FIG. 13.

FIGS. 20 and 21 are configuration diagrams of the radiation measurement apparatus 10B as the other examples of the radiation measurement apparatus according to second embodiment.

For example, as illustrated in FIG. 20, the radiation measurement apparatus 10B may the radiation detector 2B that is configured by omitting the operation display unit 61 from the radiation detector 2B of the radiation measurement apparatus 10B illustrated in FIG. 13, and the information processor 3B that is configured by omitting the data storage unit 16 and the movement alarm unit 64 from the information processor 3B of the radiation measurement apparatus 10B illustrated in FIG. 13.

That is, if the radiation measurement apparatus 10B includes the radiation detector 2B at least having the visible image acquisition unit 11 and the radiation intensity acquisition unit 12 and the information processor 3B at least having the movement distance calculation unit 62 and the resolution improvement unit 63, the radiation measurement apparatus 10B can arbitrarily be configured.

Further, the radiation measurement apparatus 10B above-described is an example where FOV of acquired visible image (and radiation intensity) is changed by using so-called camera shake caused by user. However, as illustrated in FIG. 21, the radiation measurement apparatus 10B may include the radiation detector 2B being provided with a moving device 80 that is configured to intently move the radiation measurement apparatus 10B a predetermined distance.

As described above, the radiation measurement apparatuses 10A and 10B, and the methods by using the radiation measurement apparatuses 10A and 10B enables user to intuitively recognize measurement result of radiation. Further, the radiation measurement apparatuses 10A and 10B, and the methods by using the radiation measurement apparatuses 10A and 10B can improve space resolution as well as portability.

It is noted that a manner described in each embodiment is written in a memory medium such as a magnetic disk, an optical disk, a semiconductor memory, or the like, or transmitted through transmission medium as a computer readable program. The computer readable program can be applied to various devices. A computer which realizes the apparatus reads out program held in the memory medium, thereby controls operation, and performs above-mentioned procedures.

Further, the present invention is not limited to the above-described embodiments as they are and, in an implementation phase, can be embodied in various forms other than the specific embodiments described above. Various omissions, substitutions, and changes may be made without departing from the spirit and scope of the invention. These embodiments and modifications thereof are included within the sprit and scope of the invention and are included within the scope of the invention as disclosed in the claims and equivalents thereof.

For example, FIGS. 22 and 23 are configuration diagrams of other examples of the radiation measurement apparatus according to the embodiments. As illustrated in FIG. 22, by arbitrarily combining the radiation measurement apparatus 10A and the radiation measurement apparatus 10B, the radiation measurement apparatus 10C that includes the radiation detector 2C having the visible image acquisition unit 11 and the radiation intensity acquisition unit 12, and the information processor 3C having the intensity display unit 15B, the movement distance calculation unit 62, and the resolution improvement unit 63 may be configured as the radiation measurement apparatus according to one embodiment.

Further, as illustrated in FIG. 23, the radiation measurement apparatus 10D that includes the radiation detector 2D having the visible image acquisition unit 11, the radiation intensity acquisition unit 12, the position information acquisition unit 13, and the operation display unit 61, and the information processor 3D having the intensity display unit 15B, the movement distance calculation unit 62, the resolution improvement unit 63, the data storage unit 16, the data search unit 17, the movement alarm unit 64 may be configured as the radiation measurement apparatus according to one embodiment.

REFERENCE NUMERALS 10A, 10B, 10C, 10 - - - radiation measurement apparatus
2 (2A-2D) - - - radiation detector
3A, 3B, 3C, 3D - - - information processor
5 - - - housing
11 - - - visible image acquisition unit
12 - - - radiation intensity acquisition unit
13 - - - position information acquisition unit
15A, 15B - - - intensity display unit
16 - - - data storage unit
17 - - - data search unit
18 - - - date-time management unit
22, 23 - - - view angle
24 - - - point radiation source
25 - - - object
27 - - - reflector
31 (31a, 31b) - - - visible image
32 - - - distribution image
33 - - - display image
41 - - - maximum value
42, 46 - - - coloration
43 - - - user maximum value
45 - - - display threshold
51 - - - image acquisition rate
52 - - - intensity acquisition rate
53 - - - image necessity acquisition time
54 - - - intensity necessity acquisition time
61 - - - operation display unit
62 - - - movement distance calculation unit
63 - - - resolution improvement unit
64 - - - movement alarm unit
72 - - - comparison region
73a, 73b - - - radiation intensity distribution
74a, 74b - - - original cell
75 - - - high resolution intensity distribution
76 - - - high resolution cell

The invention claimed is:

1. A radiation measurement apparatus comprising:
a visible image acquisition unit that picks up a visible image;
a radiation intensity acquisition unit that measures intensity distribution of radiation coming from a direction being substantially equal to an image picking up direction of the visible image acquisition unit;
an intensity display unit that displays an image obtained by overlaying the intensity distribution of radiation, which is represented by using a plurality of colors being allocated to the intensity distribution of radiation on the visible image;

a movement distance calculation unit that calculates a movement distance between the visible images successively picked up by the visible image acquisition unit; and a resolution improvement unit that obtains a high resolution intensity distribution of the radiation intensity distribution by overlaying a plurality of the radiation intensity distribution with a situation where the movement distance calculated by the movement distance calculation unit is shifted.

2. The radiation measurement apparatus according to claim 1, wherein the intensity display unit that allocates a first color representing maximum intensity to one of both a maximum intensity of the radiation and an intensity being set by a user.

3. The radiation measurement apparatus according to claim 1, wherein the intensity display unit is configured to display the image obtained by overlaying the intensity distribution selected from one of an intensity distribution representing an intensity being larger than an average obtained by calculating an intensity of the radiation and an intensity distribution of which an intensity is larger than predetermined percent of maximum intensity of the radiation.

4. The radiation measurement apparatus according to claim 1, wherein the intensity display unit displays an image acquired by overlaying the visible image when the intensity of the radiation is maximum and a maximum radiation intensity value when the intensity of the radiation is maximum.

5. The radiation measurement apparatus according to claim 1, wherein the visible image acquisition unit and the radiation intensity acquisition unit are accommodated in a common housing that has a reflector transmitting the radiation, reflecting a visible light to a line along an incident direction of the radiation coming into the radiation intensity acquisition unit, and wherein the visible image acquisition unit is configured to acquire the visible image from visible light reflected by the reflector.

6. The radiation measurement apparatus according to claim 1, further comprising a storage unit that stores the visible image and the radiation intensity distribution, wherein the storage unit stores the visible image and the radiation intensity distribution together with a time when the visible image acquisition unit acquires the visible image and a time when the radiation intensity acquisition unit acquires the radiation intensity distribution.

7. The radiation measurement apparatus according to claim 6, further comprising a position acquisition unit that acquires a position information of the visible image acquisition unit and the radiation intensity acquisition unit, wherein the storage unit stores the visible image and the radiation intensity distribution together with the position information.

8. The radiation measurement apparatus according to claim 6, wherein the storage unit is configured to store the visible image and the radiation intensity distribution in synchronization with smaller acquisition rate by comparing between an acquisition rate of the visible image and an acquisition rate of the radiation intensity distribution.

9. The radiation measurement apparatus according to claim 1, wherein the visible image acquisition unit and the radiation intensity acquisition unit are configured to operate in synchronization on a time when the visible image acquisition unit starts to acquire the visible image with on a time when the radiation intensity acquisition unit starts to acquire the radiation intensity distribution.

10. The radiation measurement apparatus according to claim 1, wherein the intensity display unit displays an image acquired by overlaying the high resolution intensity distribution which is represented by using a plurality of colors being allocated to the high resolution intensity distribution in accordance with a radiation intensity on the visible image.

11. The radiation measurement apparatus according to claim 1, further comprising an operation state notice unit that notices an operational state of the radiation intensity acquisition unit.

12. The radiation measurement apparatus according to claim 1, further comprising an alarm notice unit that outputs an alarm if the movement distance is larger than a threshold value whether the resolution improvement unit can acquire the high resolution intensity distribution or not upon measuring the radiation intensity.

13. The radiation measurement apparatus according to claim 1, wherein the resolution improvement unit is configured to acquire the high resolution intensity distribution by using the intensity distribution of the radiation, of which movement distance is equal to and less than a threshold value whether the resolution improvement unit can acquire the high resolution intensity distribution or not.

14. The radiation measurement apparatus according to claim 1, further comprising a storage unit that stores the visible image and the radiation intensity distribution, wherein the storage unit stores the radiation intensity distribution together with the movement distance.

* * * * *